(12) United States Patent
Galstian et al.

(10) Patent No.: US 9,065,991 B2
(45) Date of Patent: Jun. 23, 2015

(54) METHODS OF ADJUSTMENT FREE MANUFACTURE OF FOCUS FREE CAMERA MODULES

(75) Inventors: Tigran Galstian, Quebec (CA); Armen Zohrabyan, Quebec (CA); Karen Asatryan, Quebec (CA); Amir Tork, Quebec (CA); Vladimir Presniakov, Quebec (CA); Aram Bagramyan, Quebec (CA)

(73) Assignee: LensVector Inc., Sunnyvale, CA (US)

( * ) Notice: Subject to any disclaimer, the term of this patent is extended or adjusted under 35 U.S.C. 154(b) by 753 days.

(21) Appl. No.: 13/286,600

(22) Filed: Nov. 1, 2011

(65) Prior Publication Data

US 2012/0113318 A1    May 10, 2012

Related U.S. Application Data

(60) Provisional application No. 61/410,345, filed on Nov. 4, 2010.

(51) Int. Cl.
*H04N 5/225*     (2006.01)
*B29D 11/00*     (2006.01)
(Continued)

(52) U.S. Cl.
CPC ......... *H04N 5/2254* (2013.01); *Y10T 29/49826* (2015.01); *Y10T 29/49764* (2015.01);
(Continued)

(58) Field of Classification Search
CPC . H04N 5/2254; H04N 5/2253; H04N 5/2252; B29D 11/00298; B29D 11/00307; G01M 11/0257; G02B 13/0075; G02B 13/0085
See application file for complete search history.

(56) References Cited

U.S. PATENT DOCUMENTS

| 4,781,445 A | 11/1988 | Baba et al. |
| 5,808,679 A | 9/1998 | Shih |

(Continued)

FOREIGN PATENT DOCUMENTS

| JP | 2005084387 A | 3/2005 |
| JP | 2006243573 A | 9/2006 |

(Continued)

OTHER PUBLICATIONS

International Preliminary Report on Patentability for PCT/US2010/039595 issued Jan. 12, 2012.
(Continued)

*Primary Examiner* — Luong T Nguyen
(74) *Attorney, Agent, or Firm* — Anglehart et al.

(57) ABSTRACT

Methods are provided for wafer scale manufacturing camera modules without adjustment components to compensate for assembly errors and optical errors incurred within manufacturing tolerances. Camera modules are assembled in wafer arrays from arrays of image sensors, arrays of lens structures and arrays of optical trim elements. At least one of the arrays is a wafer. Lens structures are configured to provide less optical power than necessary to focus an image at infinity on image sensors without trim elements. A test performed during the wafer scale assembly of camera modules, after at least the sensor array and the lens structure array assembled, determines optical errors by identifying optical distortions and aberrations quantified in terms of optical power, astigmatism, coma, optical axis shift and optical axis reorientation deficiencies. Corresponding trim elements are configured to counteract distortions and aberrations prior to singulating useful camera modules from the array.

36 Claims, 30 Drawing Sheets

(51) Int. Cl.
*G01M 11/02* (2006.01)
*G02B 13/00* (2006.01)
*G02B 27/00* (2006.01)
*H04N 5/357* (2011.01)

(52) U.S. Cl.
CPC ..... *B29D11/00298* (2013.01); *G01M 11/0257* (2013.01); *G02B 13/0075* (2013.01); *G02B 13/0085* (2013.01); *G02B 27/0068* (2013.01); *H04N 5/3572* (2013.01)

(56) References Cited

U.S. PATENT DOCUMENTS

| | | |
|---|---|---|
| 6,359,674 B1 | 3/2002 | Horiuchi |
| 7,369,327 B1 | 5/2008 | Nishioka |
| 7,469,100 B2 | 12/2008 | Toor et al. |
| 7,715,107 B2 | 5/2010 | Loopstra et al. |
| 7,959,291 B2 | 6/2011 | Isobe et al. |
| 8,456,560 B2 * | 6/2013 | Singh .......................... 348/335 |
| 2004/0184163 A1 | 9/2004 | Nishioka et al. |
| 2006/0103758 A1 | 5/2006 | Yoon et al. |
| 2006/0203875 A1 | 9/2006 | Frenzel et al. |
| 2007/0031137 A1 | 2/2007 | Bogdan et al. |
| 2007/0063048 A1 | 3/2007 | Havens et al. |
| 2007/0229754 A1 * | 10/2007 | Galstian et al. ............... 349/200 |
| 2007/0242173 A1 | 10/2007 | Blum et al. |
| 2008/0088756 A1 | 4/2008 | Tseng et al. |
| 2008/0144186 A1 | 6/2008 | Feng et al. |
| 2008/0165427 A1 | 7/2008 | Tseng et al. |
| 2008/0251707 A1 | 10/2008 | Kathman et al. |
| 2008/0277480 A1 | 11/2008 | Thuries et al. |
| 2008/0290435 A1 * | 11/2008 | Oliver et al. ................... 257/432 |
| 2008/0297911 A1 | 12/2008 | Christenson et al. |
| 2009/0046144 A1 * | 2/2009 | Tuttle ............................... 348/61 |
| 2009/0134483 A1 | 5/2009 | Weng et al. |
| 2009/0190232 A1 | 7/2009 | Craen et al. |
| 2009/0302116 A1 | 12/2009 | Tan et al. |
| 2010/0247086 A1 | 9/2010 | Tallaron et al. |
| 2010/0276492 A1 | 11/2010 | Wang et al. |
| 2010/0295987 A1 | 11/2010 | Berge |
| 2011/0037886 A1 * | 2/2011 | Singh et al. ................... 348/340 |

FOREIGN PATENT DOCUMENTS

| | | |
|---|---|---|
| WO | WO2007098602 | 9/2007 |
| WO | WO2008041469 | 4/2008 |
| WO | WO2009153764 | 12/2009 |
| WO | WO2010022503 | 3/2010 |
| WO | WO2010083211 | 7/2010 |
| WO | WO2010129460 | 11/2010 |

OTHER PUBLICATIONS

International Search Report and Written Opinion for PCT/US2010/033347, Date of mailing Aug. 23, 2010.
International Search Report and Written Opinion for PCT/US2010/039595 issued Sep. 13, 2011.
International Search Report for PCT/US2010/033357 issued Apr. 10, 2010.
Written Opinion for PCT/US2010/033357 issued Apr. 10, 2010.

\* cited by examiner

Coating the substrate by programmable material mixture

Pre-curing the programmable layer

Assembling the LC cell using the above substrates

Applying the lens-forming programming fields

Injecting the LC material

Adjusting the temperature of the system

Starting the curing process

Adiabatically coming back to the ground state temperature

Adiabatically removing the programming fields

Figure 3C

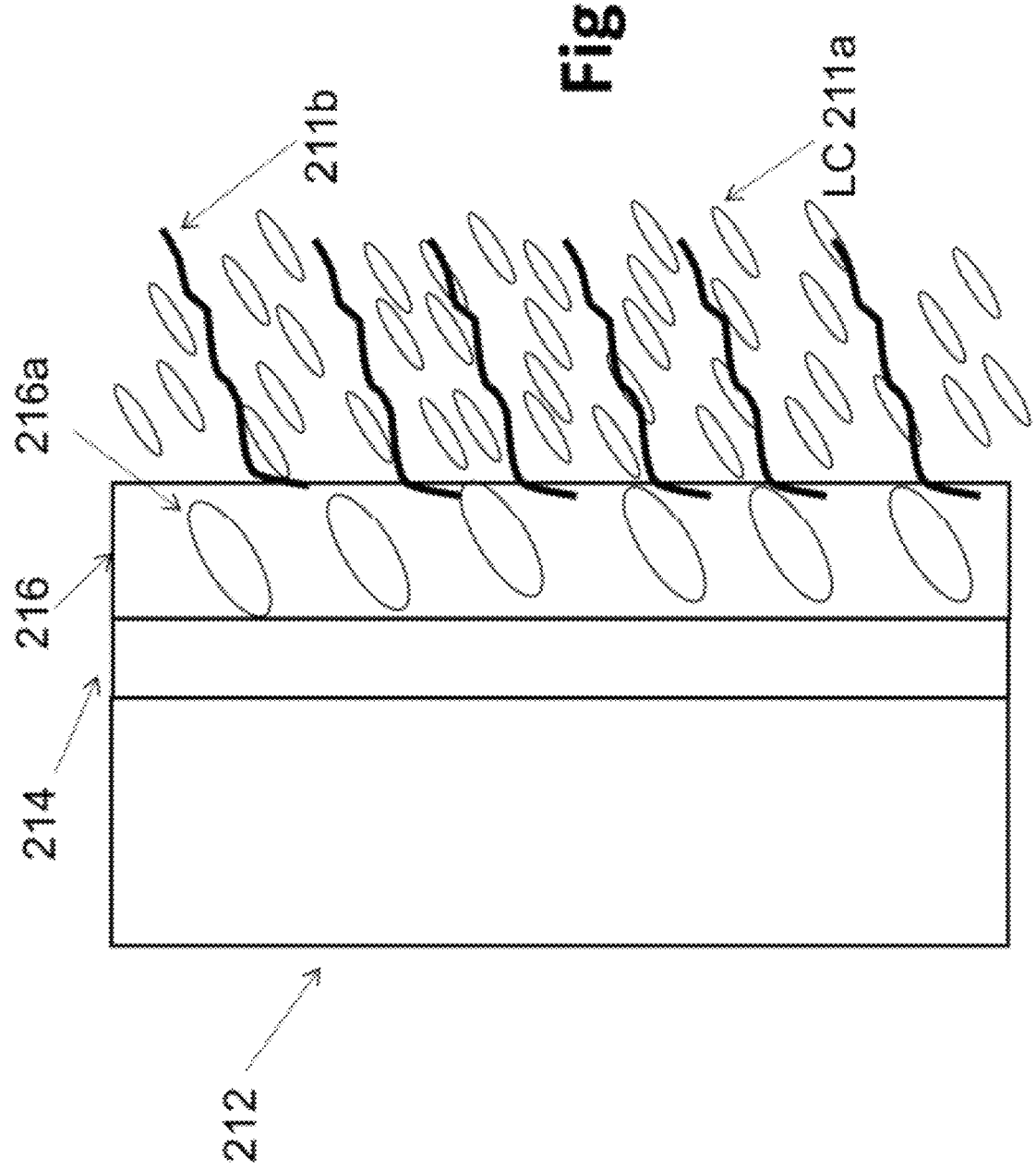

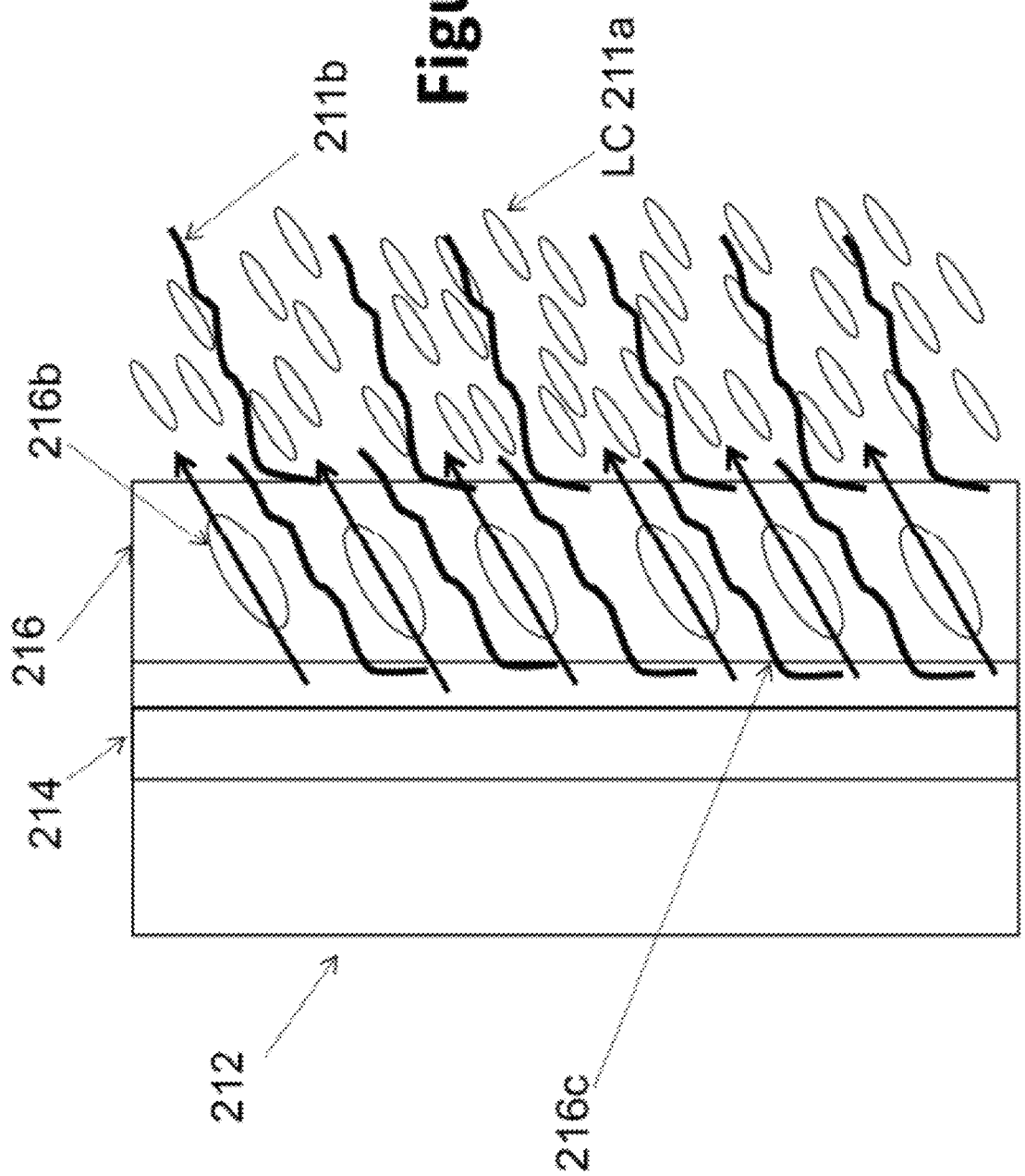

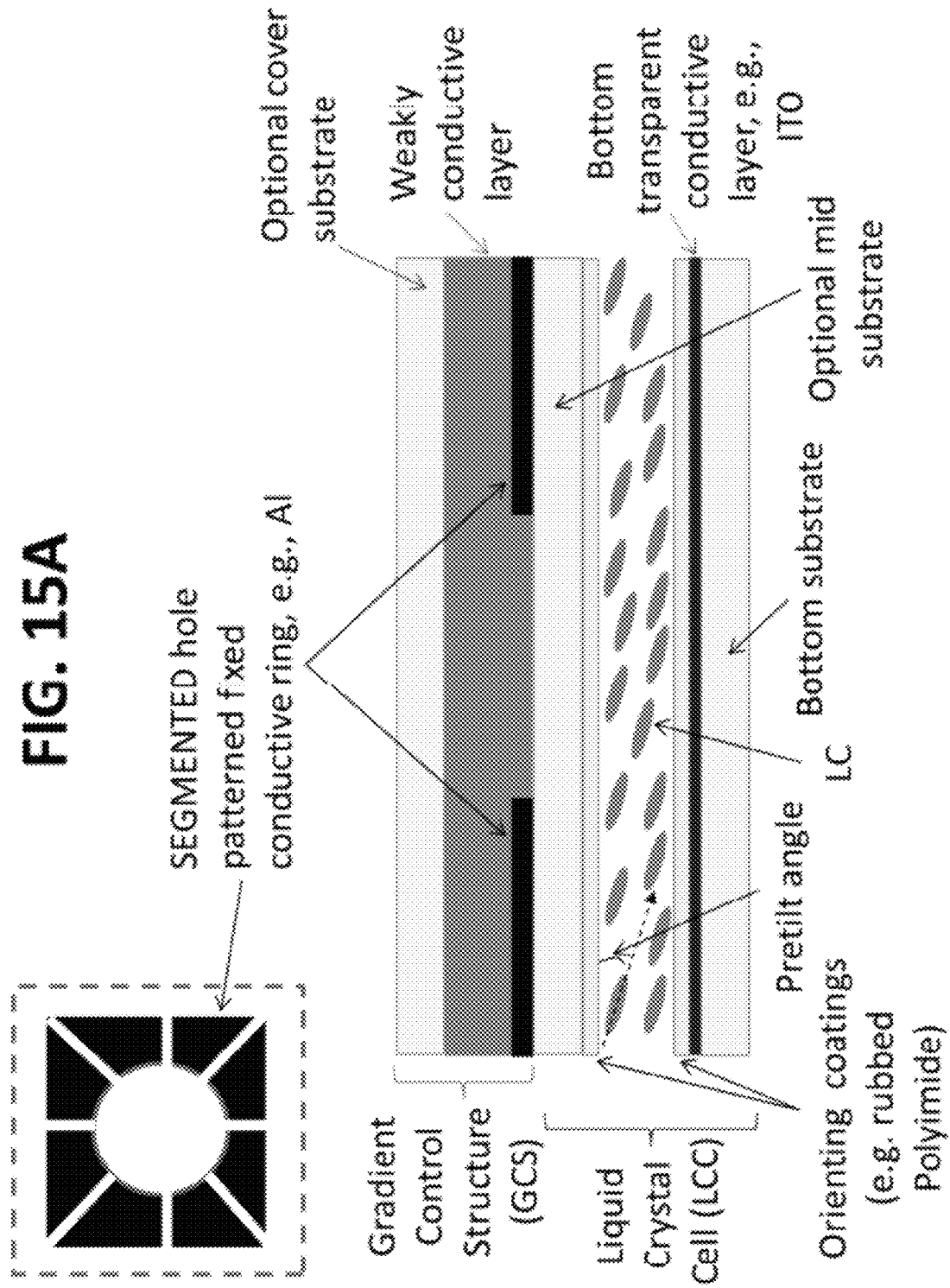

METHODS OF ADJUSTMENT FREE MANUFACTURE OF FOCUS FREE CAMERA MODULES

RELATED APPLICATIONS

This application claims priority from U.S. Provisional Application Ser. No. 61/410,345, filed on Nov. 4, 2010, the entirety of which is incorporated herein by reference.

TECHNICAL FIELD

This invention relates generally to manufacturing optical devices and assemblies and, more specifically, to mechanical adjustment-free wafer lever fabrication of focus-free camera modules.

BACKGROUND

In a variety of fields, there is a growing need for utilizing miniature camera modules of high quality. Such a camera module includes an image sensor and a fixed focus lens structure.

Lens structures for optical devices such as digital cameras consist of multiple lens elements assembled in a single barrel or stacked in wafer form utilizing spacers, to create fixed focus lens structures. Such fixed focus lens structures have a fixed focal plane. A focus-free camera module refers to a camera module that is constructed utilizing a camera housing with lenses integrated into the housing permanently with respect to the image sensor substrate. Images between infinity and some close distance to the camera are focused on the image plane of the image sensor.

Camera module assembly includes mounting the lens structure with respect to the image sensor. Best manufacturing tolerances are such that allowable assembly variations cause focus plane misalignment to such an extent that the focus plane does not fall correctly on the image plane of the image sensor in some cases not adequately so. These are not physical defects but rather shortcomings of the manufacturing process. Such assembly errors and optical errors cause the camera module to experience distortions and aberrations. Typically, assembly of such a camera module therefore leaves the camera module out of focus. In the prior art, a focus offset is provided by adjustment screws or adjustment structures. Unfortunately use of such mechanical adjustment complicates manufacturing by necessitating such additional camera module components and introduces manufacturing overheads by requiring time intensive manipulation of individual miniature components to mechanically move the lens structure to focus on objects at varying distances from the camera system. Moreover, the adjustment structure undesirably adds bulk to a camera module for what is essentially a single use.

There is a general need to increase manufacturing yields and to minimize the impact of manufacturing defects.

SUMMARY

It has been discovered that assembly errors and optical errors, within manufacturing tolerances, incurred during manufacturing of camera modules can be qualified, quantified and mitigated by employing an optical trim element (shim lens). Assembly errors and optical errors induce: aberrations, distortions, astigmatism, coma, lack of focus. The optical trim element acts as a (one time) programmable lens with a correction factor to provide compensation.

In some embodiments the optical trim element can be a fixed tunable liquid crystal lens optical device designed to have imaging properties to complement other optical components of the imaging system to reduce aberration in the imaging system. The optical properties of the liquid crystal lens can be configured to meet the needs of the imaging system to compensate for optical errors such as defects in lens components or assembly errors such as improper spacing between components. Tunable liquid crystal lenses (TLCL) that have a flat layer construction are known in the art, as described in PCT patent application WO 2007/098602, published on Sep. 7, 2007, as well as in PCT patent application WO 2009/153764 published Dec. 23, 2009, the specifications of which are incorporated herein by reference.

In accordance with the proposed solution, the lens structure has an active optical element, acting as the optical trim element, positioned within a lens structure (stack). In this configuration, by applying a required electrical drive trim signal to the active element, the optical properties of the overall lens structure are modified without any mechanical movement to compensate for assembly errors and optical errors within manufacturing tolerances of a camera module. An electrical drive signal controllable optical lens apparatus is provided that has a first optical lens and a second optical lens fixed in position relative to each other such that an optical signal can pass through both lenses. Located at a fixed position within the apparatus. is an electrically controllable active optical element. The electrical trim signal driven active optical element can be located at different positions within the lens structure without constraining wafer manufacturing. Mechanical features on the fixed focus lens elements are used to establish assembly spacing and alignment. A lens mounting structure having a barrel shape may also be used to enable easy assembly of the active element into the lens stack.

In accordance with an embodiment of the proposed solution, the active optical element which can be, for example, a Tunable Liquid Crystal Lens (TLCL), device is used to compensate for variances in the focal length of a fixed focus lens structure (stack) that occur due to manufacturing tolerances of a lens structure and imaging sensor assembly, such as the optical core (camera module) of a digital camera. The fixed focus optical lens structure, having one or more fixed focus optical lenses, through which an optical signal passes, as well through the TLCL. The TLCL changes its optical characteristics from a first state to a second state (e.g., from a first optical power to a second optical power) in response to an input electrical drive trim signal. This changes the influence that the TLCL has on incident light (optical signal), and may change the focusing power of the overall device. A mounting for the lens structure, the image sensor and the TLCL supports these components in their intended (predetermined) relative positions. It has been discovered that by configuring the camera core such that the optical and physical manufacturing tolerances are insufficient to ensure a desired precision in focusing an image on the camera module image sensor when the TLCL is at a nominal optical power, assembly errors and optical errors within manufacturing tolerances can be addressed by driving the TLCL, this inaccuracy can be compensated for to allow the image to be correctly focused on the image sensor. The focal plane of the lens structure could be moved to compensate for assembly errors and optical errors. Thus, the task of mechanically adjusting the lens structure with respect to the image sensor plane and the necessary mechanical adjustment components may be eliminated by making focus adjustments using the TLCL. In this configuration, the active optical element is designed to be integrated with the lens structure without interfering with precise alignment and spacing of other optical elements within the stack. When the TLCL is located inside the stack, the aperture of the TLCL can be smaller than if the TLCL is located outside the stack (typically 25% smaller).

The lens structure may have the active optical element positioned within a lens structure (stack). In this embodiment, a lens barrel is split into two sections at the active optical element plane. By applying a required restorative electrical drive trim signal to the active element, the optical properties of the lens structure are modified without any mechanical movement. In case of a TLCL as the active optical element, the focal plane of the lens structure could be moved to compensate for assembly errors and optical errors.

In other embodiments the optical trim element can be a parametric lens optical device designed to have optical properties to complement other optical components of the imaging system to reduce aberration in the imaging system. The optical properties of the parametric lens can be configured to meet the needs of the imaging system to compensate for assembly errors and optical errors such as defects in lens components or spacing between components.

In some implementations, a liquid crystal lens is made by programming alignment surfaces of the LC cell walls using a programming field to align the alignment surface molecules before fixing them. By setting the desired pre-tilt, the lens can operate in the absence of the control field, and power consumption by the control field can be reduced.

The alignment layer can be planar or non-planar. In the case that it is non-planar, it may be of a lens shape. When the alignment layer is non-planar the orientation of the molecules of the ordered surface can be essentially uniform, for example to provide a liquid crystal lens that changes index of refraction from an index of refraction value the same as its surrounding cell walls to a different index of refraction to provide a lens.

When the alignment layer is planar, the orientation of the molecules is spatially non-uniform so as to create a lens. The programming field is thus non-uniform in this case. Spatially non-uniform magnetic or electric fields can be provided by spatially non-uniform electrodes, such as point source electrodes, patterned electrodes and segmented electrodes having electrode portions at different positions. Spatially non-uniform electric fields can also be provided by using planar electrodes in combination with an electric field modulating layer, such as a layer of spatially modulated dielectric constant. Spatially non-uniform electric fields can also be created by using electrodes that provide a spatially variable charge distribution in view of complex dielectric properties or spatially variable conductivity properties.

In the case of a planar alignment layer, the present invention can provide a fixed or non-tunable flat liquid crystal lens by using suitable alignment layers to create in the ground state of the liquid crystal lens with the appropriate spatial distribution of index of refraction. These parameters are obtained by testing the camera module core. In this sense testing provides calibration.

In further embodiments the optical trim element can be a deposited lens optical device designed to have imaging properties to complement other optical components of the imaging system to reduce aberration in the imaging system. The optical properties of the deposited lens can be configured to meet the needs of the imaging system to compensate for assembly errors and optical errors such as defects in lens components or spacing between components.

A method of wafer level manufacturing of a multitude of camera modules by first fabricating a wafer-level component structure layered on an array of liquid crystal optical devices is provided. This wafer-level structure includes a liquid crystal layer and a multitude of electrode layers for applying an electric field to the liquid crystal layer. A multitude of optical components are affixed to a surface of the component structure, each in a different predetermined location of the surface, including depositing a fixed lens compensating for manufacturing tolerances. Predetermined regions of the resulting camera array are then separated so as to singulate a multitude of camera modules therefrom, such that each camera module includes a wafer-level fabricated camera module assembly and at least one optical trim element affixed thereto.

In accordance with an aspect of the proposed solution there is provided a method of wafer scale manufacturing a camera module, said method comprising: providing an array of image sensors; providing a corresponding array of lens structures; assembling said array of lens structures and said array of image sensors, each lens structure being mounted on a corresponding image sensor; providing an array of configurable optical trim elements, each trim element being configured to correct a preset optical power of a corresponding lens structure when said trim element is combined with a corresponding lens structure and image sensor assembly; determining optical errors of said assembled lens structure and image sensor array; configuring each said trim element corresponding to each said image sensor and lens structure assembly to compensate for said optical errors; assembling said array of trim elements and said array of lens structure and image sensor assemblies forming an array of camera modules; and singulating a camera module from said camera module array, each said camera module excluding mechanical adjustment means and said method of manufacturing excluding mechanical adjustment steps to compensate for optical errors.

In accordance with another aspect of the proposed solution there is provided a camera module manufactured employing a method of wafer scale manufacturing, said method comprising: providing an array of image sensors; providing a corresponding array of lens structures; assembling said array of lens structures and said array of image sensors, each lens structure being mounted on a corresponding image sensor; providing an array of configurable optical trim elements, each trim element being configured to correct a preset optical power of a corresponding lens structure when said trim element is combined with a corresponding lens structure and image sensor assembly; determining optical errors of said assembled lens structure and image sensor array; configuring each said trim element corresponding to each said image sensor and lens structure assembly to compensate for said optical errors; assembling said array of trim elements and said array of lens structure and image sensor assemblies forming an array of camera modules; and singulating a camera module from said camera module array, each said camera module excluding mechanical adjustment means and said method of manufacturing excluding mechanical adjustment steps to compensate for optical errors.

In accordance with another aspect of the proposed solution there is provided a method of manufacturing a camera module, said method comprising: providing an image sensor; providing a lens structure; assembling said lens structure and said image sensor, said lens structure being mounted on said image sensor; providing a configurable optical trim element configured to correct a preset optical power of said lens structure when said trim element is combined with said lens structure and image sensor assembly; determining optical errors of said assembled lens structure and image sensor; configuring said trim element to compensate for said optical errors; and assembling said trim element and said lens structure and image sensor assembly forming a camera module, said camera module excluding mechanical adjustment means and said method of manufacturing excluding mechanical adjustment steps to compensate for optical errors.

In accordance with another aspect of the proposed solution there is provided a camera module manufactured employing a method of manufacturing a camera module, said method comprising: providing an image sensor; providing a lens structure; assembling said lens structure and said image sensor, said lens structure being mounted on said image sensor; providing a configurable optical trim element configured to correct a preset optical power of said lens structure when said trim element is combined with said lens structure and image sensor assembly; determining optical errors of said assembled lens structure and image sensor; configuring said trim element to compensate for said optical errors; and assembling said trim element and said lens structure and image sensor assembly forming a camera module, said camera module excluding mechanical adjustment means and said method of manufacturing excluding mechanical adjustment steps to compensate for optical errors.

BRIEF DESCRIPTION OF THE DRAWINGS

The invention will be better understood by way of the following detailed description of embodiments of the invention with reference to the appended drawings, in which:

FIG. 3C is a schematic diagram illustrating a flow diagram of a process for fabrication of an oriented LC cell with surface polymer stabilized (optionally inter diffused) liquid crystal in accordance with the second embodiment of the proposed solution;

FIG. 5A illustrates schematically an enlarged side sectional view of the alignment surface area showing an enhancement of the programming efficiency by incorporation of anisotropic "guest" species, such as molecules, micro and nano particles and tubes (or planes) in the surface programmable ("host") layer that is optionally inter diffused with liquid crystal (already programmed state is shown);

FIG. 5B illustrates schematically an enlarged side sectional view of the alignment surface area showing an enhancement of the programming efficiency by incorporation of "permanent field maintaining" anisotropic "guest" species, such as molecules, micro and nano particles and tubes (or planes) in the surface programmable ("host") layer that is optionally inter diffused with liquid crystal (already programmed state is shown);

FIG. 15A is a schematic diagram showing a side sectional view of a tunable liquid crystal lens with an inset top view of a segmented top electrode according to an embodiment in which a weakly conductive layer or frequency dependent material is above the segmented, hole patterned electrode;

DETAILED DESCRIPTION

Figure 1A:
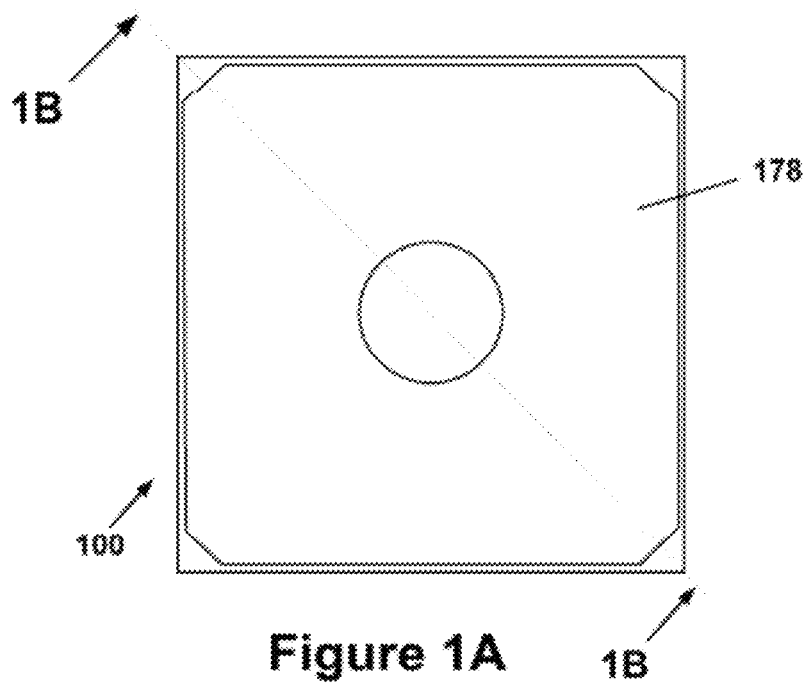
FIG. 1A is a schematic diagram showing a top view of an assembly including a unitary image sensor, a barrel lens mounting and a tunable liquid crystal lens optical trim element which function as a fixed focus camera module in accordance with a first embodiment of the proposed solution.

Most miniature cameras include a separate housing, a lens barrel, and an image sensor among other parts. One important operation during assembly is to thread the lens barrel into the housing, activate the image sensor, and adjust the focus by turning the barrel to achieve the best focus for camera system. This operation requires special equipment and is costly due to extra operation and may reduce yield by creating particles due to rubbing of barrel surface against the housing thread surface.

It has been discovered that assembly errors within manufacturing tolerances can be qualified and quantified. One way of manufacturing camera modules without increasing bulk is to robotically position the lens structure with respect to the image sensor with increased precision, dispense adhesive between the lens structure and the image sensor, wait for adhesive to set before letting go. While bulk reductions are provided, such methods require special equipment and reduces yield due to the wait times for the adhesive to set which are too long for mass manufacturing. A large number of robotic hands would have to be tied up for relatively long periods of time while the adhesive sets in order to achieve mass manufacture.

In accordance with the proposed solution, arrays of lens structures that use stacked fixed focus optical lenses in combination with arrays of optical trim elements are used to compensate for assembly errors and optical errors incurred in wafer scale manufacturing of camera modules as arrays. Depending on the specific configuration, the apparatus may be directed to one of several applications, including compact digital cameras, such as might be integrated into a portable telephone, a laptop, a monitor bezel, etc. In each implementation, the apparatus uses the optical properties of the lens structure in combination with the optical properties of the optical trim element to compensate for assembly errors and optical errors within manufacturing tolerances.

Methods of manufacturing camera modules (having fixed focus) are not perfect. Assembly errors and optical errors within manufacturing tolerances introduce: aberrations, distortions, astigmatism, coma, lack of focus, etc. The optical trim element provides compensation and acts to address assembly errors and optical errors.

Manufacturing starts with an array of camera module components such as an array of image sensors on a wafer substrate or printed circuit board substrate, or an array of lens elements on a wafer substrate. The wafer substrate is employed to handle a large number of devices in parallel to increase manufacturing yields. At least the fixed focus lens structure and image sensor arrays are assembled by various wafer fabrication and assembly processes. In some implementations, the camera module core includes camera module less the optical trim element. In other implementations, the core camera module includes the whole camera module with the optical trim element. However, the core camera module may not include casing elements, etc. Wafer level assembly testing includes detecting manufacturing shortcomings of camera module core arrays. In some implementations an array of the optical trim elements is also assembled. In which case complete camera module arrays are tested for optical errors. The optical errors are qualified and quantified. Configuration parameters are obtained by testing the camera module core. In this sense testing provides calibration.

The provided array of optical trim elements is configured to compensate for the assembly errors and optical errors. In some embodiments the array of optical trim elements are purpose wafer fabricated. In other embodiments arrays of prefabricated optical trim elements are configured to compensate for assembly errors and optical errors. In some embodiments, either array fabrication and configuration can be performed at the wafer level in situ with the optical trim element arrays already assembled in the camera module array. In some embodiments, active optical trim elements are configured to be driven to compensate for the assembly errors and optical errors.

In all embodiments, the fixed focus lens structures are fabricated mindful of possibly incurring assembly errors and lens structure optical errors within manufacturing tolerances and mindful of optical properties of the corrective optical trim elements. For example each fixed focus lens structure is configured either through optical power selection or spacing from the corresponding image sensor to purposefully provide less than the adequate focus for objects at infinity (under design) when the camera module is manufactured with minimal assembly errors and optical errors. For example, the lens structure may provide less than the necessary optical power by about 0.5 diopters or may be positioned to require about 0.5 a diopter to achieve infinity focus (myopic). The optical trim element has an intrinsic (known) optical power which augments the optical power of the lens stack or the optical trim element itself provides the required optical spacing to focus images at infinity on the image sensor.

Testing of the camera module core as (partly) assembled during wafer level fabrication detects manufacturing shortcomings and provides the necessary optical trim lens parameters to compensate for the assembly errors and optical errors. Once the optical trim elements are configured and the camera module arrays are fully assembled and, operation testing determines useful camera modules which are singulated from the array.

Specific embodiments include:

Wafer Level Manufacture of Camera Modules on an Image Sensor Substrate

Wafer level manufacturing uses a carrier substrate, such as a glass or plastic plate, to which an array of optoelectronic devices, such as camera modules, are bonded and then "singulated" into individual camera modules.

In accordance with an embodiment of the proposed solution, the carrier substrate is a Printed Circuit Board (PCB) having and array of PCB areas for auxiliary electronic components of individual camera modules. An array of image sensors is mounted to the PCB and in this sense the PCB and image sensors are referred to as the image sensor substrate on which the rest of the camera modules are wafer level fabricated. Lens array structures are added to a image sensor substrate by way of mounting, etching, injection molding or deposition so as to provide a wafer with an array of camera modules that can be singulated into individual camera modules. Fabrication of such camera modules in wafer form makes manufacture more efficient for a number of reasons, some of which are: (parallel) processing of the wafer is much faster than processing of individual components, and testing of the components can be done faster for the array while on the wafer than after singulation. The use of a carrier substrate allows for the wafer to be handled as a single item of a relatively large size. This is faster and easier than handling individual chips having small dimensions that make such handling difficult.

Figure 1B:
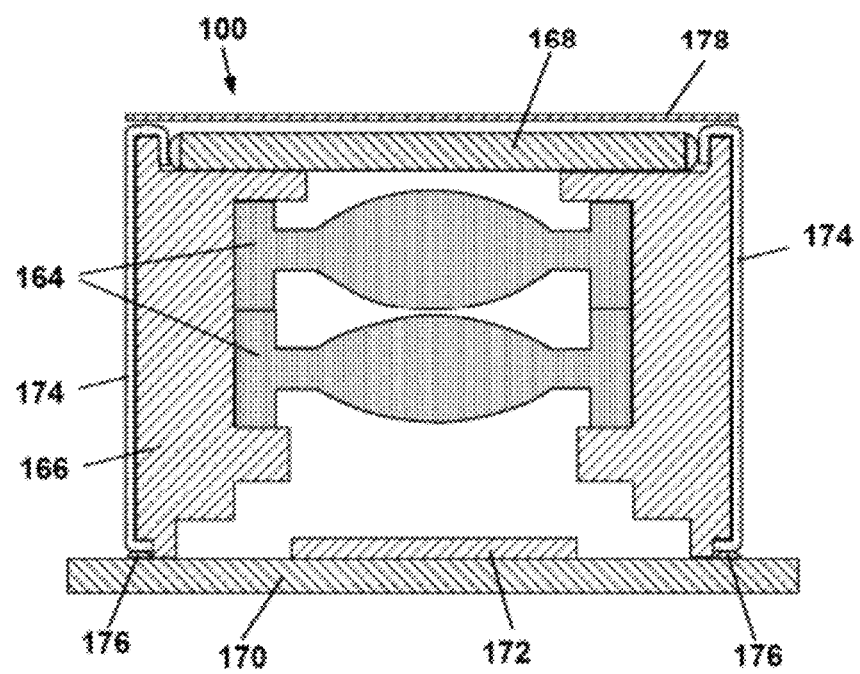
FIG. 1B is another schematic diagram showing a cross sectional side view of a wafer containing an assembly of FIG. 1A.

In an implementation illustrated in FIGS. 1A and 1B, there is shown a camera module 100 of an array of such camera modules assembled employing wafer manufacturing techniques on a wafer 170 of image sensors. FIG. 1A is a top view of one camera module, and shows a section line along which the cross section of FIG. 1B is taken. Two lens elements 164 are permanently mounted within a housing 166 with no adjustability for focus. It is beneficial in this, and other implementations that the two fixed lens components make contact with each other to ensure a proper alignment and orientation between them. An optical trim element such as a TLCL 168 is located on the housing 166 opposite image sensor substrate 170, to which image sensor 172 is mounted. A bare TLCL 168 (TLCL part with no housing or FPC) is placed into the top cavity and aligned with respect to the lens barrel aperture. At this time, conductive adhesive is applied to connect the contacts 174 on the TLCL 168 to the electrical contacts in the housing, after which the top cover 178 is placed over the TLCL 168 to close the housing. Electrical connection is made between the substrate 170 and the TLCL 168 via metallic inserts 174 that run vertically in the corners of the housing, being connected to the substrate 170 via conductive glue 176. The electrical contacts 176 can be connected to the substrate 170 by the conductive adhesive 176 over connection pads on the image sensor substrate 170. Thus, this configuration allows electrical connection between the TLCL 168 and the substrate 170, despite the fact that the barrel assembly may have imprecise height and rotational angle relative to the housing.

After attachment the camera core is tested for optical errors. The housing 166 also makes use of bumps at its base (not shown) to provide a precise setoff between the housing and the substrate 170. Alternatively, the barrel housing may be permanently attached to the image substrate using, for example ultrasonic welding, or any other useful technique known in the art. It will be appreciated that the barrel housing 166 can be provided with a base, for example incorporating a flange, and that electrical connections between the active embedded optical element (168) and the circuit board 170 may be through the barrel base. A top cover 178 of the housing blocks light except that in the main optical path, and provides mechanical protection to TLCL 168, which is mounted at the top of the device, above the fixed lenses.

A focus-free camera module refers to a camera module that is constructed utilizing a camera housing with lenses integrated into the housing permanently before lens structure attachment to the image sensor substrate. Thus, for a configuration such as that shown in FIGS. 1A and 1B, there will be no mechanical focus adjustment during the assembly process. The main issue with such a construction is that the tolerances of the assembly (physical and optical) may not be tight enough to ensure a precise focus at the sensor surface, and an out-of-focus image may result. In the present embodiment, minute focus errors within manufacturing tolerances can be compensated for by configuring the optical power of TLCL 168 acting as a fixed optical trim element.

For example, the TLCL 168 is used a fixed optical trim element to add optical power to achieve infinity focus. Thus, the fixed focus lens structure is designed to have an optical power that ranges due to manufacturing tolerances between an extreme of infinity focus and another extreme of an amount optical power that is insufficient to achieve infinity focus when the fixed focus lens structure is mounted in a fixed manner to the image sensor substrate. The TLCL provides the variable shortfall. Configuration parameters are obtained by testing the camera module core. In this sense testing provides calibration.

It will be appreciated that in various implementations, the active optical element can be placed on the top, in the middle, or on the bottom of other lens elements depending on the optical design of the fixed element.

Figure 2A:
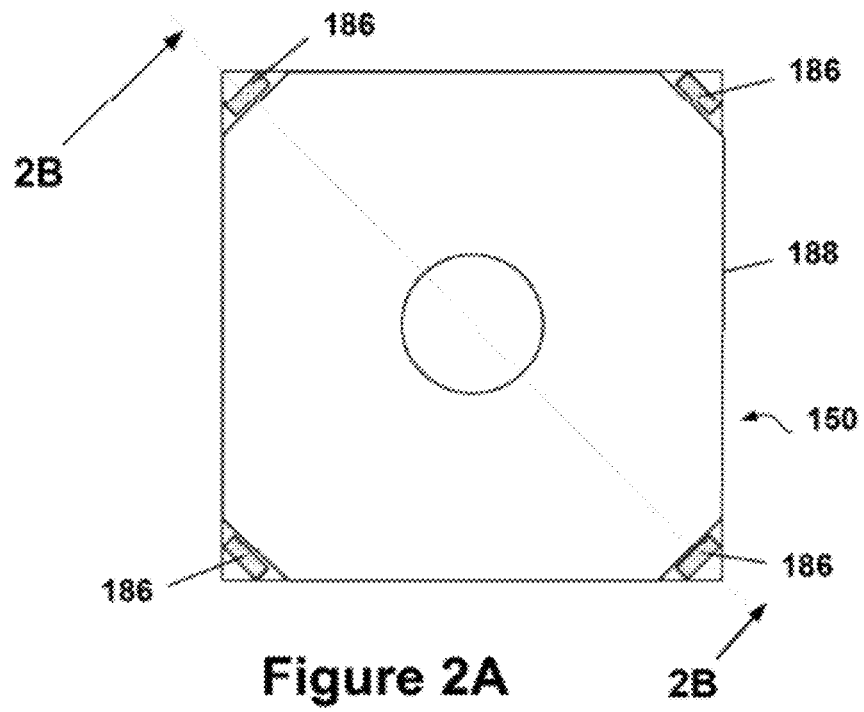
FIG. 2A is a schematic diagram showing a top view of an assembly similar to that of FIGS. 1A and 1B, but that has the tunable liquid crystal lens optical trim element located between two lens elements of a lens structure.
Figure 2B:
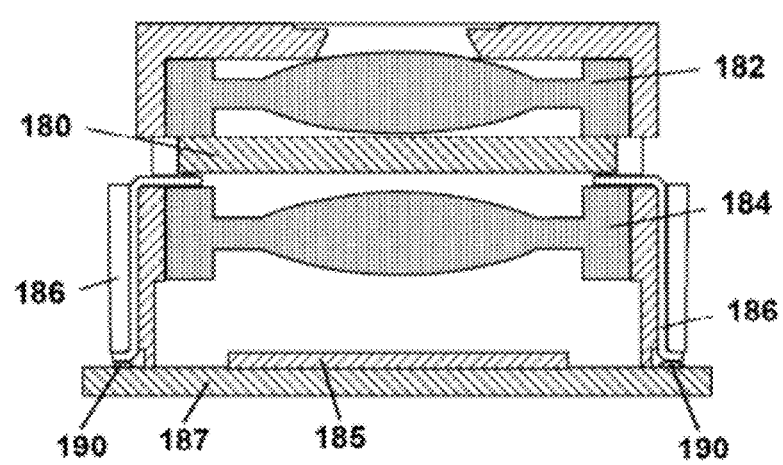
FIG. 2B is another schematic diagram showing a cross sectional side view of a wafer containing an assembly of FIG. 2A.

In accordance with another implementation, FIGS. 2A-2B illustrate a focus-free camera module 150 using an active optical element (TLCL 180) located between primary lens 182 and secondary lens 184 of the lens structure (stack). This configuration is similar to that of FIG. 1, except for the location of the TLCL optical trim element. It is beneficial in this, and other implementations that the lens structure components make contact with each other to ensure a proper alignment and orientation between them. The focus plane of the lens structure can be set by configuring the optical power of the TLCL 180 to compensate for an improper distance of the lens structure from the sensor 185, or for focusing errors due to the focal length tolerances of the primary and secondary lenses. As with the embodiment of FIGS. 1A and 1B, this design enables economic manufacture of cameras, allowing the use of parts with non-precision tolerances and avoiding the need for a mechanical focus adjustment operation.

The top view of FIG. 2A shows the location of metallic inserts 186 along the side edges of the lens housing 188. Unlike the FIG. 1A, 1B embodiment, the metallic inserts do not run all the way to the top of the housing but, rather, only to the location of the TLCL 180. This is shown in the cross section of FIG. 2B, which is taken along the section line shown in FIG. 2A and which shows the relative positions of the fixed lenses and the TLCL within the housing. The inserts 186 are connected to the image sensor substrate 187 using conductive glue 190, and the housing has a setoff bump (not shown). Alternatively, the barrel housing may be permanently attached to the image substrate using, for example ultrasonic welding, or any other technique known in the art. This configuration, along with the capability of the embedded TLCL to adjust the focus plane, can enable proper camera focus without adjustment of the lens structure.

When compensating for focus variations due to manufacturing tolerances, it is important to consider the optical power that can be contributed using a TLCL. In a typical TLCL, the nominal optical power is zero diopters, corresponding to the non-powered stated of the TLCL. The optical power of the TLCL may thereafter be increased by providing an electrical trim drive signal that powers the electric field of the device to reorient the liquid crystal. Thus, if the camera module uses a TLCL that has a zero diopter nominal optical power, the TLCL may be used to change the overall optical power of the camera module in only one direction. Without limiting the invention, the overall optical power may be increased by providing an electrical signal to the TLCL. That is, the compensation of optical power variation due to manufacturing tolerance is effective for both positive and negative variations in optical power sense.

In one implementation, therefore, optical power of the fixed focus lens structure is selected so that the camera module is in proper focus when the variation due to the manufacturing tolerances is at the maximum expected value. Thus, if the overall variation due to tolerances was at the highest expected optical power, the focus of the camera module would be correct when the TLCL was at its nominal (e.g., zero) optical power. This would mean that all other possible optical power variations due to manufacturing tolerances would be lower, and the adjustment to a desired focus would require the addition of optical power, which could be provided by powering the TLCL. This ensures the ability to compensate for manufacturing tolerances using the TLCL.

Movable Optical Axis Liquid Crystal Lens

While the proposed solution has been described with respect to focus insufficiency compensation, a TLCL with a segmented electrode employing frequency drive and a frequency dependent material layer can be configured to compensate for astigmatism errors, coma errors, optical axis shift errors and optical axis reorientation errors. For example Tunable Liquid Crystal Lenses having a movable optical axis are described in co-pending U.S. Provisional Patent Application 61/289,995 entitled "Image Stabilization And Shifting In A Liquid Crystal Lens" filed Dec. 10, 2009, the entirety of which is incorporated herein by reference.

Figure 15B:
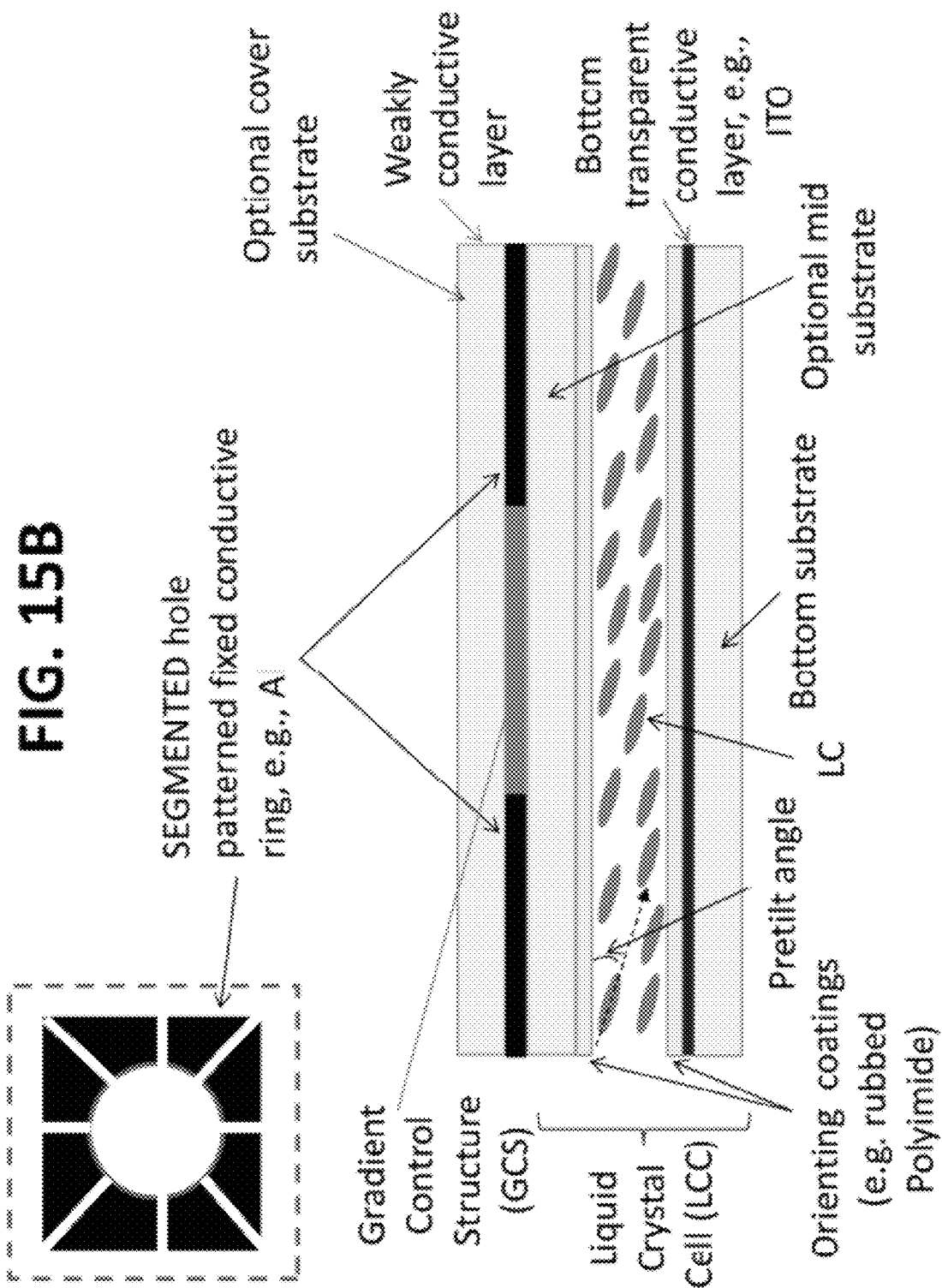
FIG. 15B is a schematic diagram showing a side sectional view of a tunable liquid crystal lens with an inset top view of a segmented top electrode according to an embodiment in which a weakly conductive layer or frequency dependent material is within the aperture of the segmented, hole patterned electrode.

FIG. 15A illustrates a side sectional view of a tunable liquid crystal lens with an inset top view of a segmented top electrode according to an embodiment in which a weakly conductive layer or frequency dependent material is above a segmented hole patterned electrode. It has been discovered that the optical axis of the lens can be moved by varying only the voltage of common frequency control signals fed to the segments. Alternatively, a change in the shape can be performed by varying the frequency of signals fed to the segments. The lens can be calibrated with a desired control signal frequency and amplitude for each segment as a function of optical power and of optical axis position, and a controller can draw on calibrated values from a look-up-table. Moreover, a controller may employ interpolation functionality to derive desired control signal frequencies and amplitudes based on calibrated values from the look-up-table.

Figure 15C:
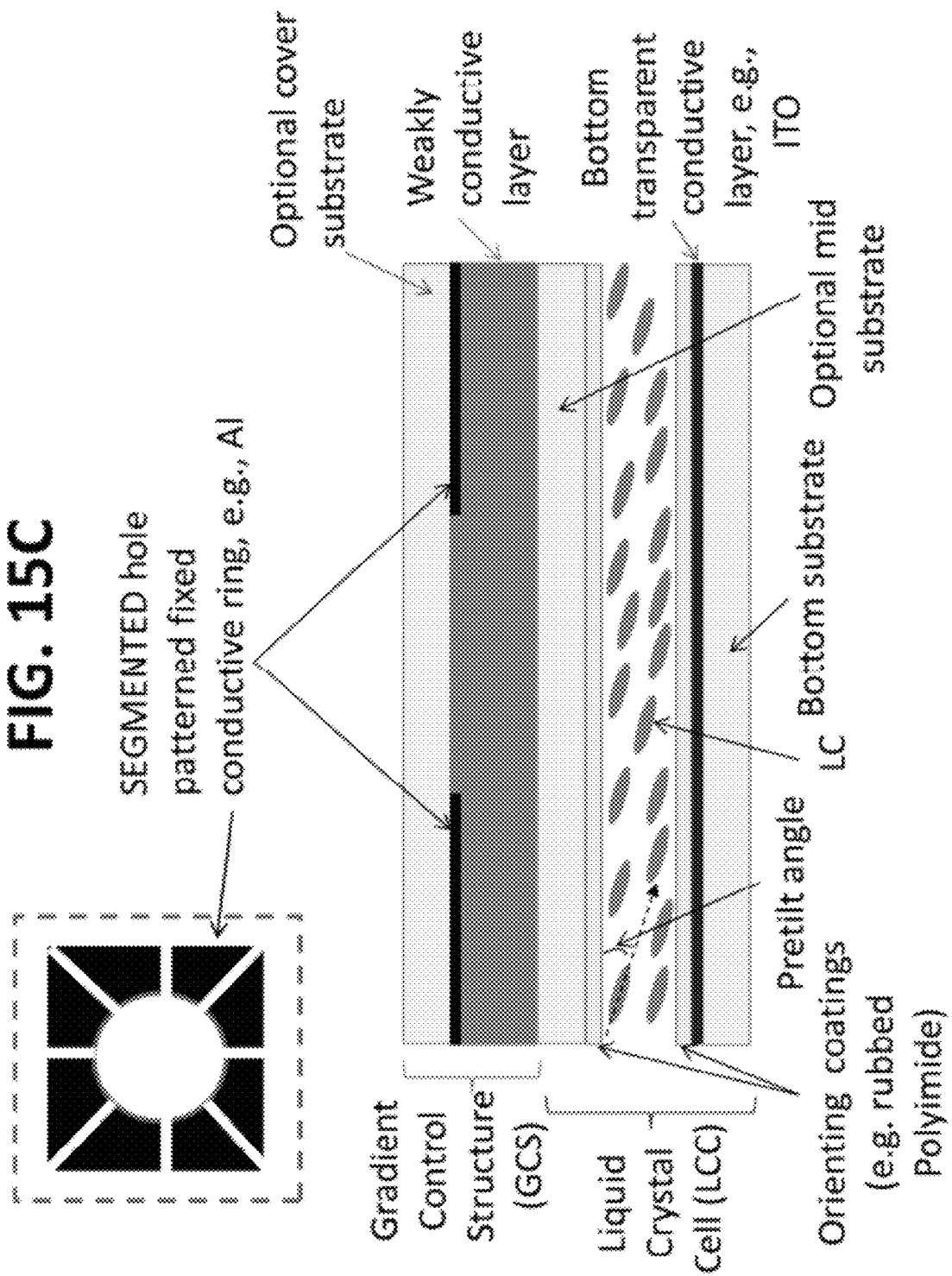
FIG. 15C is a schematic diagram showing a side sectional view of a tunable liquid crystal lens with an inset top view of a segmented top electrode according to an embodiment in which a frequency dependent material is below the segmented, hole patterned electrode.

The positioning of the weakly conductive layer or frequency dependent material can be on top of and covering the segmented electrode, within the aperture of the segmented electrode (see FIG. 15B) or underneath the segmented electrode (see FIG. 15C).

Figure 16A:
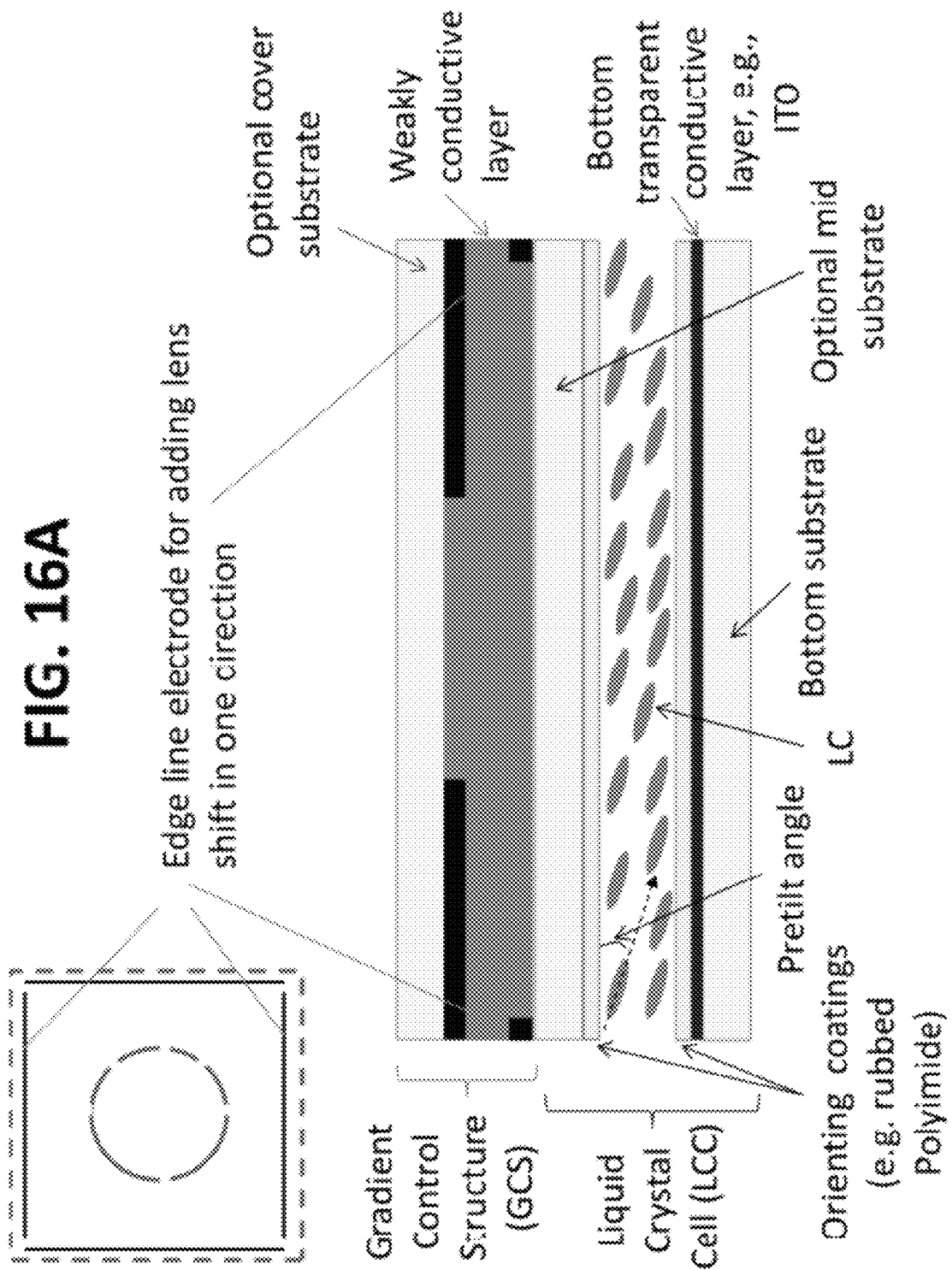
FIG. 16A is a schematic diagram showing a side sectional view of a tunable liquid crystal lens with an inset top view of a top, hole patterned electrode with additional lateral electrodes placed under the top hole patterned electrode according to an embodiment.
Figure 16B:
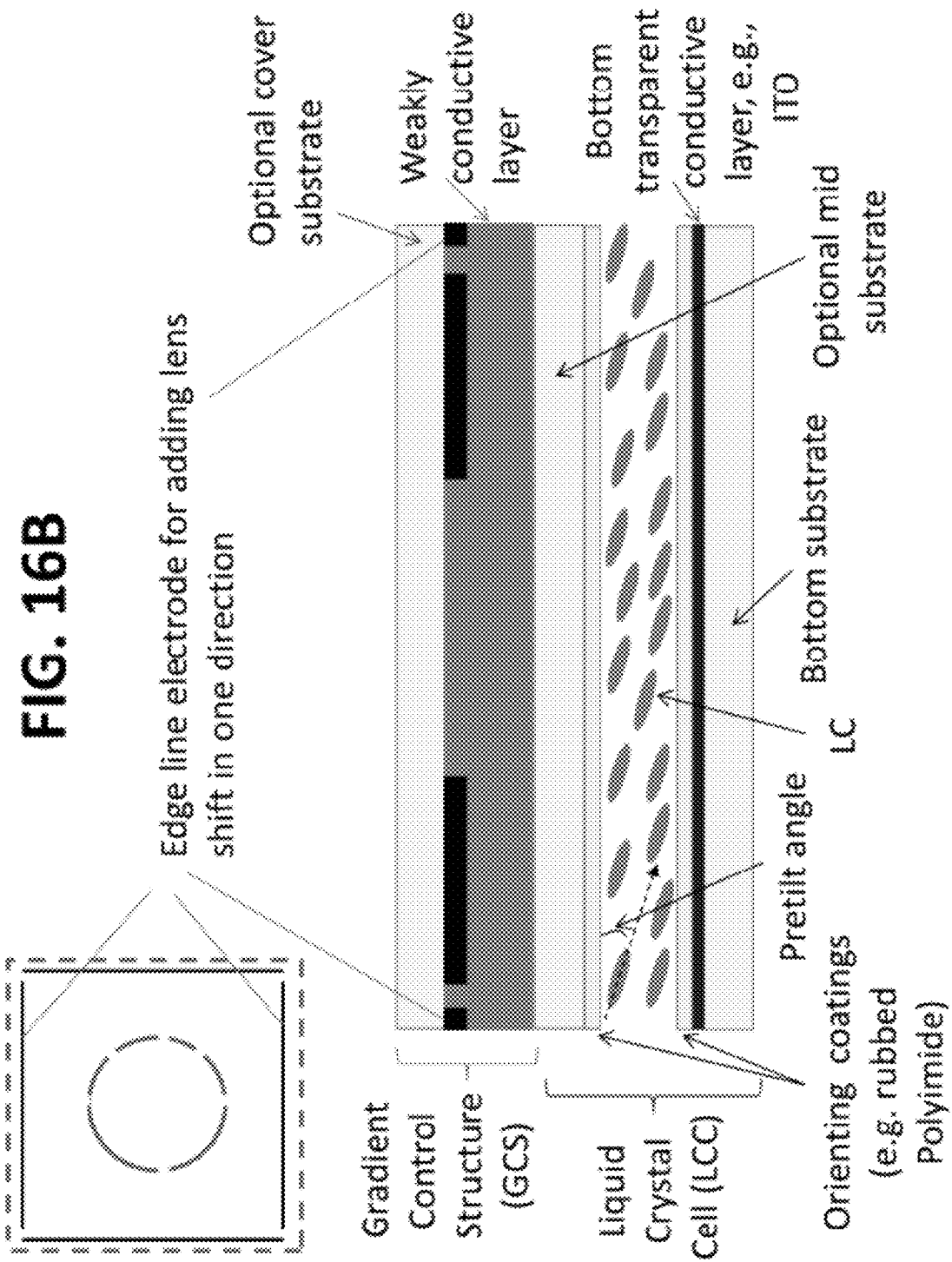
FIG. 16B is a schematic diagram showing a side sectional view of a tunable liquid crystal lens with an inset top view of a top, hole patterned electrode with additional lateral electrodes placed outside of periphery of the top hole patterned electrode according to another embodiment.

Altering the optical axis of the TLC lens by shifting of the electric field can be achieved without using a segmented electrode. For example, FIG. 16A illustrates a side sectional view of a tunable liquid crystal lens with an inset top view of a top, hole patterned electrode with additional lateral electrodes placed under the top hole patterned electrode. In this implementation, a frequency is applied to a lateral or side electrode that increases the electric field across the liquid crystal cell in a decreasing manner from one side to the other. This type of control provides a type of beam steering or a type of incident ray angle selection that is combined with the lens formation. The side electrodes can be under the hole patterned electrode as illustrated or on a same substrate level outside of the periphery of the hole patterned electrode as illustrated in FIG. 16B.

Figure 17:
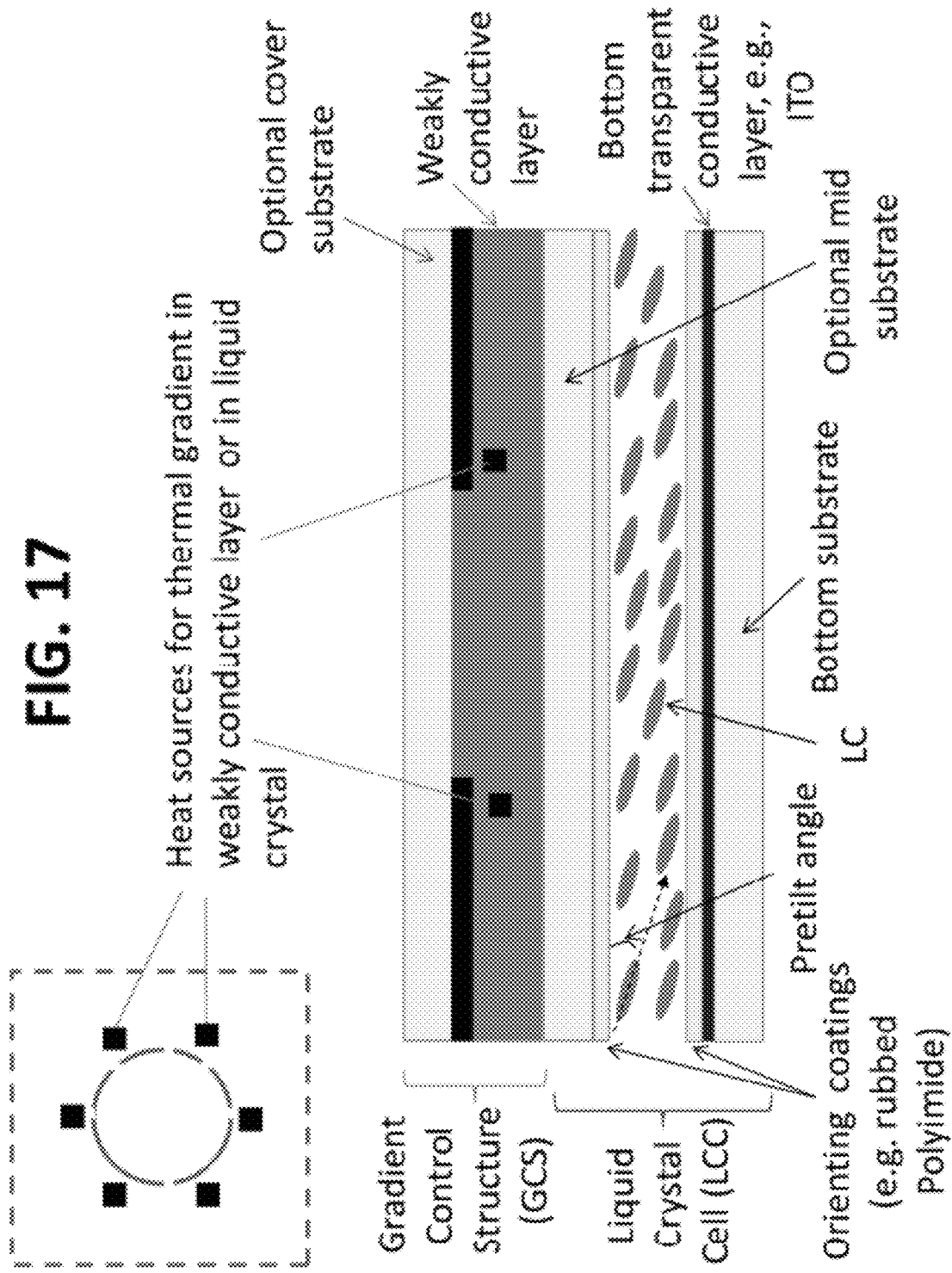
FIG. 17 is a schematic diagram showing a side sectional view of a tunable liquid crystal lens with an inset top view of a top, hole patterned electrode with additional resistive heat sources placed under the top hole patterned electrode according to a further embodiment.

The behavior of the frequency dependent material can be affected by temperature. As illustrated in FIG. 17, the creation of a controllable thermal gradient within the frequency dependent material layer can be used to move the optical axis of the lens and therefore reorient the optical axis of the image sensor and TLCL system. The temperature also affects the ability of the liquid crystal to change orientation, and thus this approach can be used within the liquid crystal layer as well. It will be appreciated that this technique for shifting the optical axis can be used with different arrangements for spatially modulating the liquid crystal orientation change, such as different techniques for spatially modulating the electric field or different techniques for spatially modulating the liquid crystal orientation, such as polymer dispersion or spatially programmed alignment layers.

Figure 18:
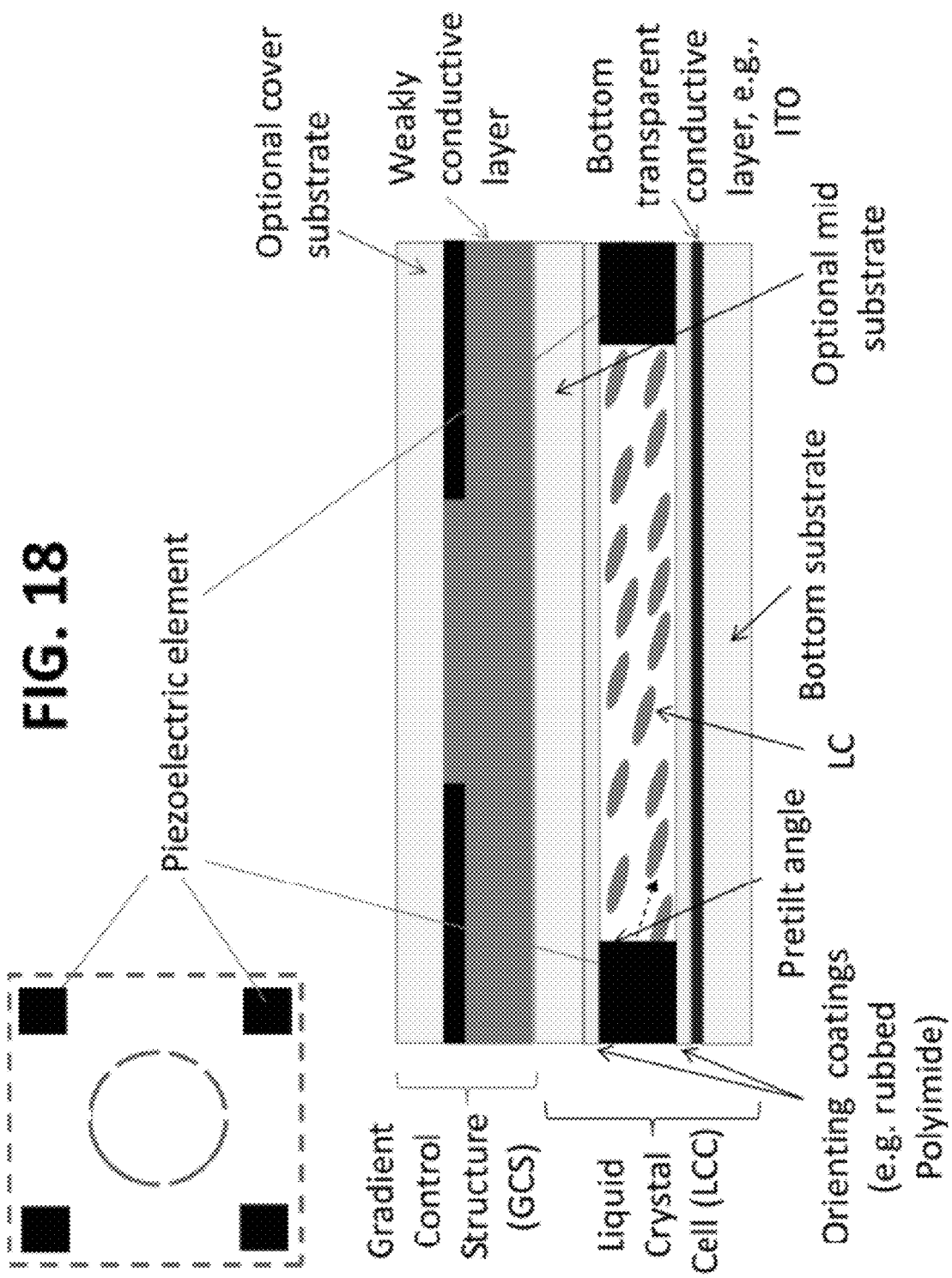
FIG. 18 is a schematic diagram showing a side sectional view of a tunable liquid crystal lens with an inset top view of a top, hole patterned electrode with additional piezoelectric elements placed between substrates of the liquid crystal cell in corners thereof according to yet another embodiment.

FIG. 18 illustrates a side sectional view of a tunable liquid crystal lens with an inset top view of a top, hole patterned electrode with additional piezoelectric elements placed between substrates of the liquid crystal cell in corners thereof which can be controllably driven electrically to expand and cause a desired tilt in the spacing between the substrates. Piezo elements can be deposited on the substrate during fabrication of the lens device. Alternatively, closed, fluid filled cells can be controllably heated to expand and cause the desired tilt in the spacing between the substrates. It will be appreciated that this technique for shifting the optical axis can be used with different arrangements for spatially modulating the liquid crystal orientation change, such as different techniques for spatially modulating the electric field or different techniques for spatially modulating the liquid crystal orientation, such as polymer dispersion or spatially programmed alignment layers.

Figure 19A:
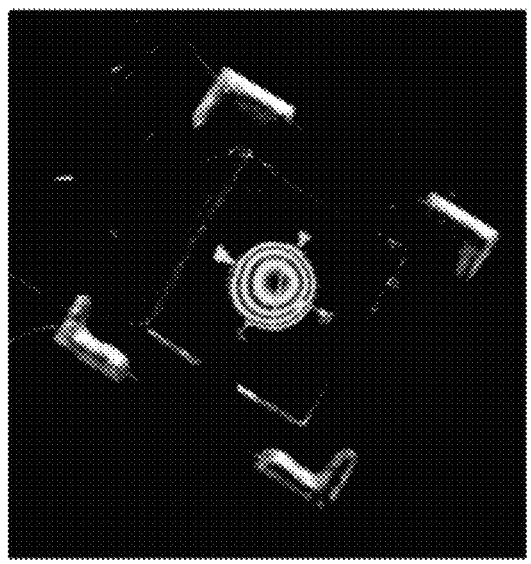
FIG. 19A is a schematic diagram showing a top view of a tunable liquid crystal lens of the embodiment of FIG. 15A, FIGS. 19B, 19C and 19D showing different states of shift of the tunable liquid crystal lens optical axis using the segmented electrodes.
Figure 19D:
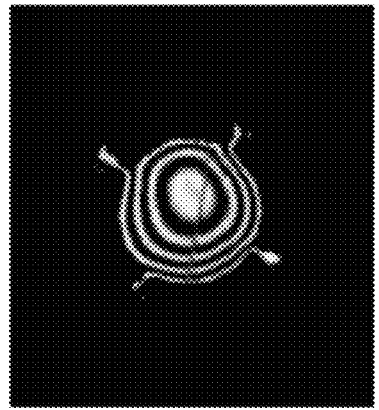
Figure 19C:
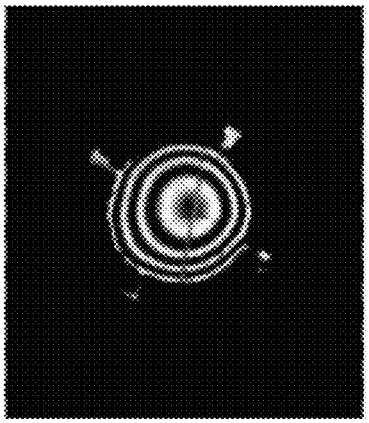
Figure 19B:
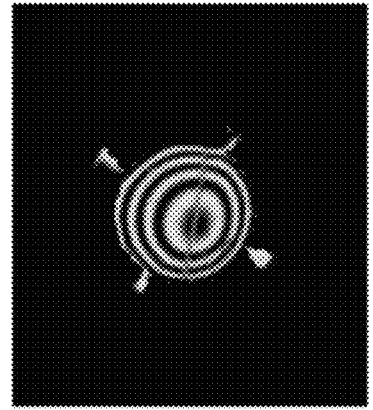

FIG. 19A illustrates a top view of a tunable liquid crystal lens of the embodiment of FIG. 15A with different states of shift 19B, 19C and 19D of the optical axis of the TLCL using the segmented electrodes.

The control parameters for configuring each segmented electrode TLCL optical trim element can be obtained from testing the camera module core. In this sense testing the camera module core is understood to entail calibration and the control parameters for configuring the segmented electrode TLCL as calibration parameters. Such calibration can be performed after camera module integration into an overall device for a specific application (mobile telephone, monitor bezel, etc.). Repeating calibration at a rate can be employed to provide active image stabilization. Therefore, employing a segmented electrode TLCL provides optical error compensations for aberrations and distortions including focus insufficiency errors, optical axis shift optical errors, optical axis reorientation optical errors, coma errors, astigmatism errors, etc.

In another implementation, the TLCL is able to provide sufficient optical power to replace one lens within the fixed focus lens structure. In these embodiments, the TLCL has its value set to provide the desired fixed focus, such as infinity focus under the conditions of the assembly of the camera module having mounting and fixed lens tolerance variations. The optical power of the TLCL is then fixed. The optical power of a TLCL can be fixed by setting the drive signal with a programmable memory, resistor trimming, etc.

Parametric Lens

In accordance with another embodiment of the proposed solution, in an arrangement similar to that shown in FIG. 1 parametric lens optical trim element can be provided instead of TLCL 168. In this embodiment, however without limiting the invention thereto, parametric lens arrays are manufactured separately. Following testing of camera core arrays, the parametric lens array is configured and then wafer level assembled with the camera cores. Configuration parameters are obtained by testing the camera module core. In this sense testing provides calibration.

An example of such a parametric lens is described in co-pending commonly assigned International Patent Application WO 2010/006420 claiming priority from U.S. Provisional Application 61/080,493 filed 14 Jul. 2008 both of which are incorporated herein by reference, and in International Patent Application WO 2010/006419 entitled "Surface Programming Method And Light Modulator Devices Made Thereof" filed Jul. 14, 2009. LC lenses are based on the alignment of LC molecules on substrates that are sandwiched together to form the LC cell. The interaction of LC with the surface of the substrate is of importance the most important reasons being: the necessity to have a returning force (to enable "free" relaxation) and to provide a pre-tilt angle to trigger a predictable reorientation direction. By way of a short introduction, the traditional way of achieving the desired alignment of LC molecules was (and still is) the mechanical rubbing of the surface of the substrate. While the substrate itself may be processed in this way to achieve LC alignment, very often, specific alignment layers are first coated on the inner surface of the substrate carrying already a transparent conductive layer, such as Indium Tin Oxide (ITO), which are then rubbed. An example of such layer is the polyimide polymer family. The rubbing process is not reliable, may damage the cell, create non-uniformities and dust. Intensive efforts are devoted to develop non-contact alignment methods of LC alignment:

For example, photo alignment and vacuum deposition have been proposed with various levels of success. Both approaches have yet to be adopted for large scale, cost effective and reliable manufacturing processes.

A further approach to creating an alignment layer with a desired pre-tilt angle involves using a dual polymer composition having vertical and horizontal components that are then baked or rubbed to achieve different uniform pre-tilt angles. Again, the required rubbing is not reliable, may damage the cell, create non-uniformities and dust.

Use of non-contact (rubbing free) LC alignment is proposed for tunable lens devices using optical and electromagnetic torque and simultaneous curing of the alignment layer including an inter-diffused polymer-liquid crystal material system, which is stabilized by the surface of the cell. Excitation geometries and methods described herein below allow rubbing-free alignment of LC molecules in different structures and with desired out-of-plane pretilt programming.

In this section of the specification, the term "ordered surface layer formed with molecules aligned using a programming field without mechanical rubbing" is used to mean a surface layer that is formed using molecules that are aligned by light, acoustic waves, an electric field, a magnetic field, or any other suitable field able to cause an ordering in alignment of molecules that are then stabilized to provide an alignment surface for the liquid crystal cell. While a precursor or foundation substrate may be initially rubbed, the formation of the ordered surface layer is done without rubbing or use of directional vacuum deposition.

The alignment layer may be formed by alignment of molecules already present on a layer using the alignment field, or by bringing onto a substrate molecules, from a surrounding liquid medium, aligned by the alignment field and stabilizing those molecules to form the ordered layer surface. The alignment field can be provided by an external source acting on its own or a combination of an external field and the liquid crystal cell's own control field.

In some implementations, a liquid crystal lens is made by programming alignment surfaces of the LC cell walls using a programming field to align the alignment surface molecules before fixing them. By setting the desired pre-tilt, the lens can operate in the absence of the control field, and power consumption by the control field can be reduced.

The alignment layer can be planar or non-planar. In the case that it is non-planar, it may be of a lens shape. When the alignment layer is non-planar the orientation of the molecules of the ordered surface can be essentially uniform, for example to provide a liquid crystal lens that changes index of refraction from an index of refraction value the same as its surrounding cell walls to a different index of refraction to provide a lens.

When the alignment layer is planar, the orientation of the molecules is spatially non-uniform so as to create a lens. The programming field is thus non-uniform in this case. Spatially non-uniform magnetic or electric fields can be provided by spatially non-uniform electrodes, such as point source electrodes, patterned electrodes and segmented electrodes having electrode portions at different positions. Spatially non-uniform electric fields can also be provided by using planar electrodes in combination with an electric field modulating layer, such as a layer of spatially modulated dielectric constant. Spatially non-uniform electric fields can also be created by using electrodes that provide a spatially variable charge distribution in view of complex dielectric properties or spatially variable conductivity properties.

In the case of a planar alignment layer, the present invention can provide a fixed or non-tunable flat liquid crystal lens by using suitable alignment layers to create in the ground state of the liquid crystal lens with the appropriate spatial distribution of index of refraction. These parameters are obtained by testing the camera module core. In this sense testing provides calibration.

In some implementations, the alignment layer is programmed such that the resulting effect on the liquid crystal is to place the liquid crystal at an orientation with respect to the control field that in the ground state (or otherwise at low control voltages close to the ground state) is in a linear range of change of index of refraction as a function of control voltage.

While separate parametric lens configuration has been mentioned, the invention is not limited thereto. A parametric lens can be fabricated as a TLCL having a segmented electrode described hereinabove. Parametric lenses can be configured in situ for example a lens structure can include the parametric lens as a top component as illustrated in FIG. 1B and within the lens structure as illustrated in FIG. 2B.

In all configurations of the present invention, it is possible to arrange liquid crystal layers in orthogonal directions to act on both polarizations of light, as well as to arrange layers having their directors in opposed direction to reduce an angular dependence associated with the liquid crystal lens system.

Figure 3A:
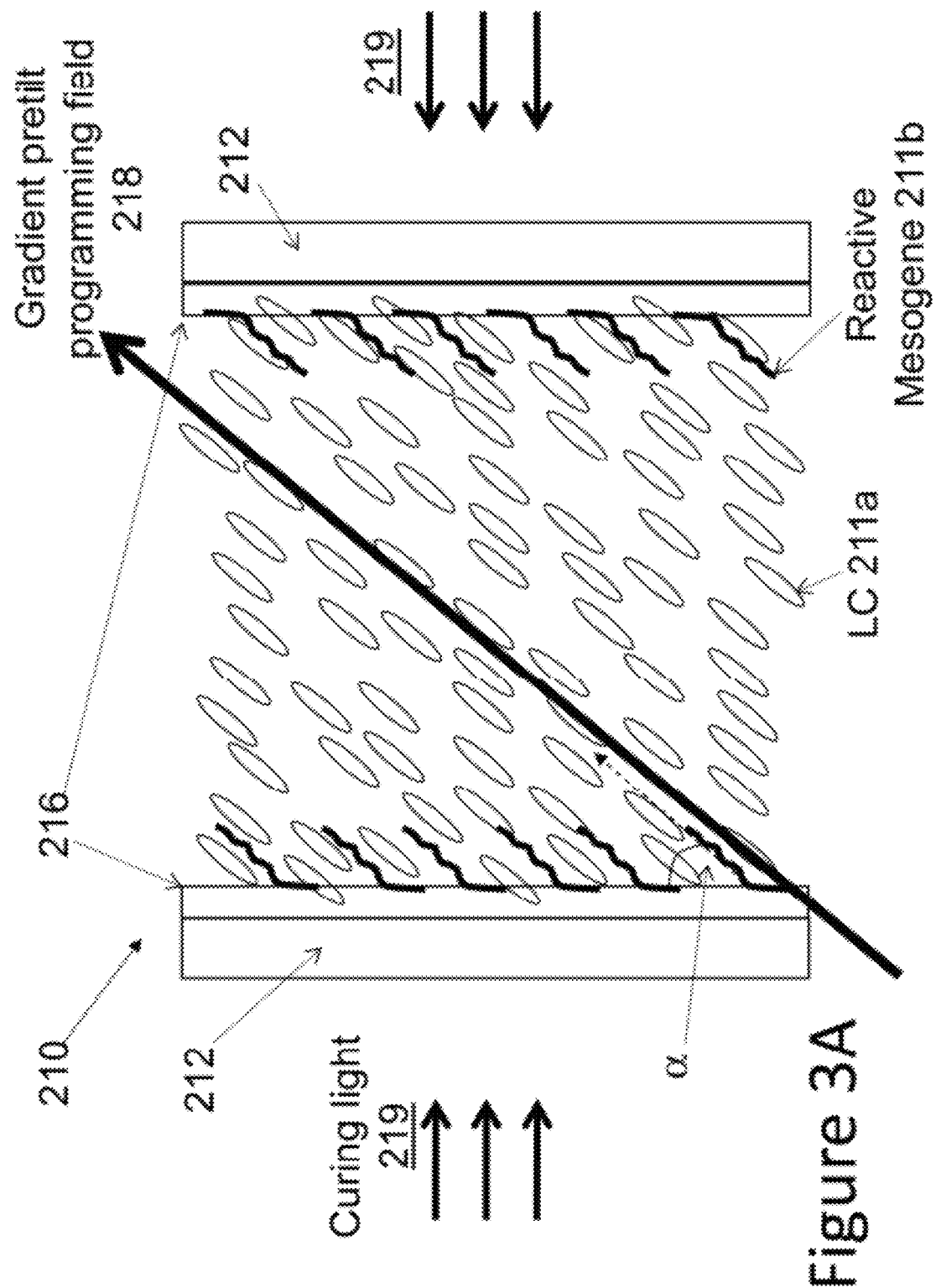
FIG. 3A is a schematic side view of one programming method to achieve a gradient index desired pretilt angle, $\alpha_0$ LC cell filled with surface polymer stabilized (optionally inter diffused) liquid crystal using simultaneous excitation (by electric and magnetic fields), orienting (in general, at a spatially varying angle $\alpha$, or on a non-planar cell geometry) and curing in accordance with a second embodiment of the proposed solution.
Figure 3B:
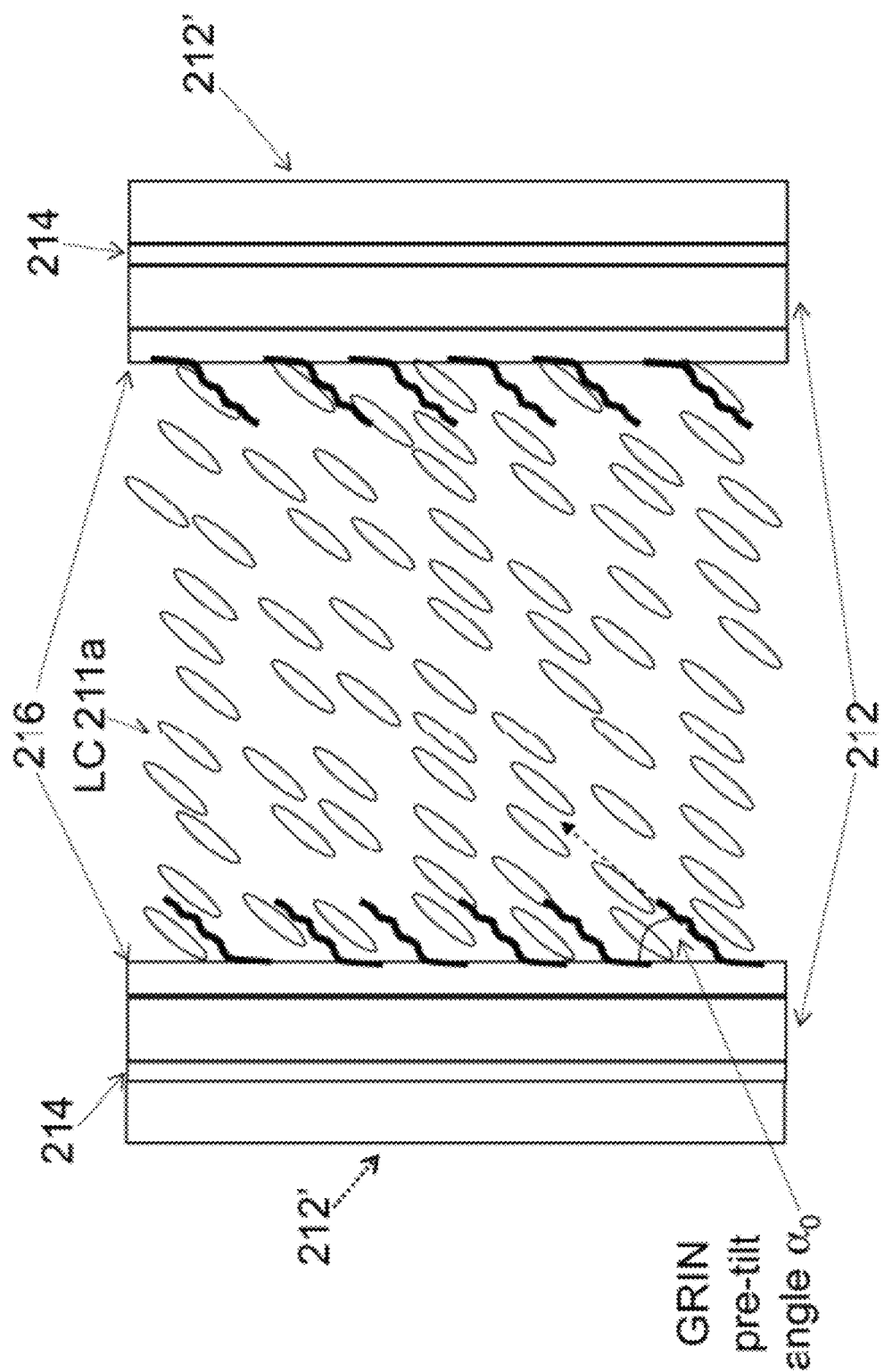
FIG. 3B is another schematic diagram illustrating a side view of the "final" oriented LC cell filled with surface polymer stabilized (optionally inter diffused) liquid crystal in the ground state (after programming, no excitation), and transparent electrodes (alone or with additional substrates) added to the initial cell from both sides to enable the electrical control of the obtained cell.

More specifically, FIG. 3A schematically illustrates the fabrication of an oriented LC cell 210 filled with surface polymer stabilized (optionally inter diffused) liquid crystal 211a. As shown in FIG. 3B, such a device has after its programming a programmed LC orientation in the ground state, namely without the typical electric field excitation. For simplicity of illustration, this orientation is shown as being of a spatially uniform direction, however, to form a lens it will be appreciated that it is of a predetermined spatial profile.

The surface "programmable" layer 216 is preferably chosen out of materials which have good orientational correlation (before and after the polymerization) with LC molecules. Examples of such materials can be different types of poyimides as used for rubbed alignment layers, reactive mesogenes 211b, etc.

The cell 210 shown here has no built-in electrodes to enable the use of various types of excitation (including electrical) during the programming. The use of reactive mesogenes 211b (polymerizable liquid crystals) can significantly increase the efficiency of the programming thanks to the strong orientational correlation of those molecules with the molecules of LC 211a. In one embodiment, the surface "programmable layer" 216 can be deposited on the surface of the cell substrate 212 by well known means in the industry, such as spin coating, dip coating, evaporation, etc. and preferably be partially cured (solidified) by heat, light or other type of exposure 219.

In one implementation, the surface "programmable layer" can be deposited with a preferential direction directly on the cell substrate or on the top of a support layer that is already deposited on the cell substrate and processed adequately to provide adhesion and initial alignment of the "programmable layer", if necessary (depending upon the type of programming method).

In the example of FIG. 3A, the "programmable layer" 216 is first deposited on the cell substrate 212, preferably precured and used to build LC cells. The LC material is then injected into the cell 210 using vacuum, capillary, drop fill or other methods. The temperature of the system (the cell) is preferably maintained at a level that supports the strong interaction of the "programming layer" with the LC molecules. For example, in the case of using a reactive mesogene as programmable layer, this can be a temperature when both the reactive mesogene 211b and LC 211a are in the LC (e.g., nematic) phase. Then, a magnetic field H 218 is applied to align LC molecules. The applied external torque on prefer- ably inter-diffused system of LC-programmable layer orients LC molecules (in the bulk and preferably near the surface) and the programmable layer material system along the desired direction a. Then, the final curing process of the programmable layer, namely the reactive mesogene molecules 211b coating the programmable layer 216 is started by means of light, heat or other types of solidification methods.

Once the curing is ended, the obtained surface layer 216 maintains a certain pre-tilt angle $\alpha_0$, preferably as close as possible to the angle a used during programming or having a value defined by that angle, as shown in FIG. 3A.

Figure 3D:
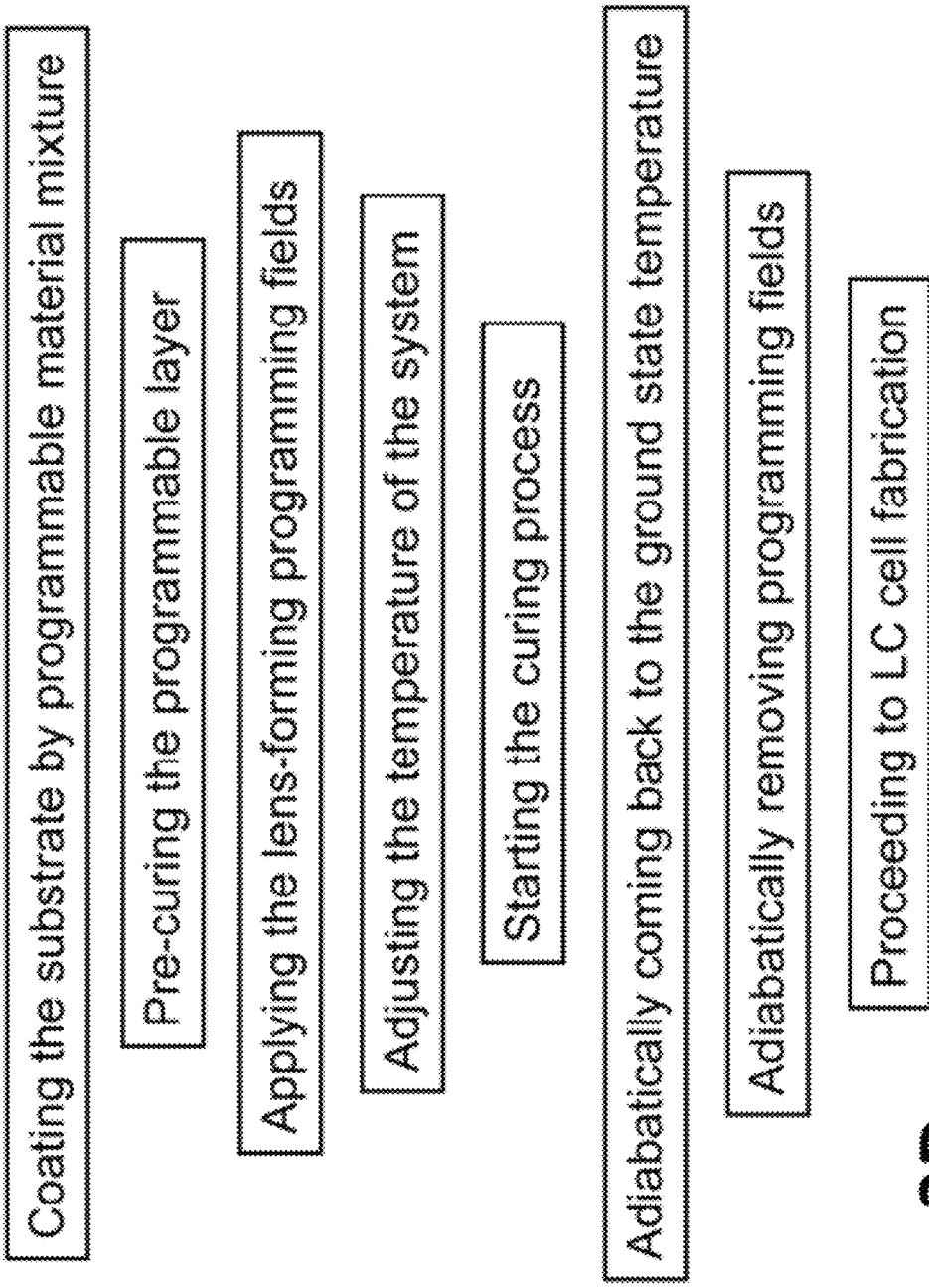
FIG. 3D is another schematic diagram illustrating a flow diagram of a process for fabrication of an oriented LC cell with surface polymer stabilized (optionally inter diffused) liquid crystal, in which the programming of the surface is however done here without the LC in the cell.

FIG. 3C illustrates the steps of the process for fabrication of an oriented LC cell with surface polymer stabilized (optionally inter diffused) liquid crystal in the present embodiment. The orders of some actions may be changed (for example the order of temperature adjusting or field application, etc.), but the main point here is the surface programming in the presence of LC material. FIG. 3D illustrates the steps for fabrication of the programmable layer without the presence of the LC.

Figure 4A:
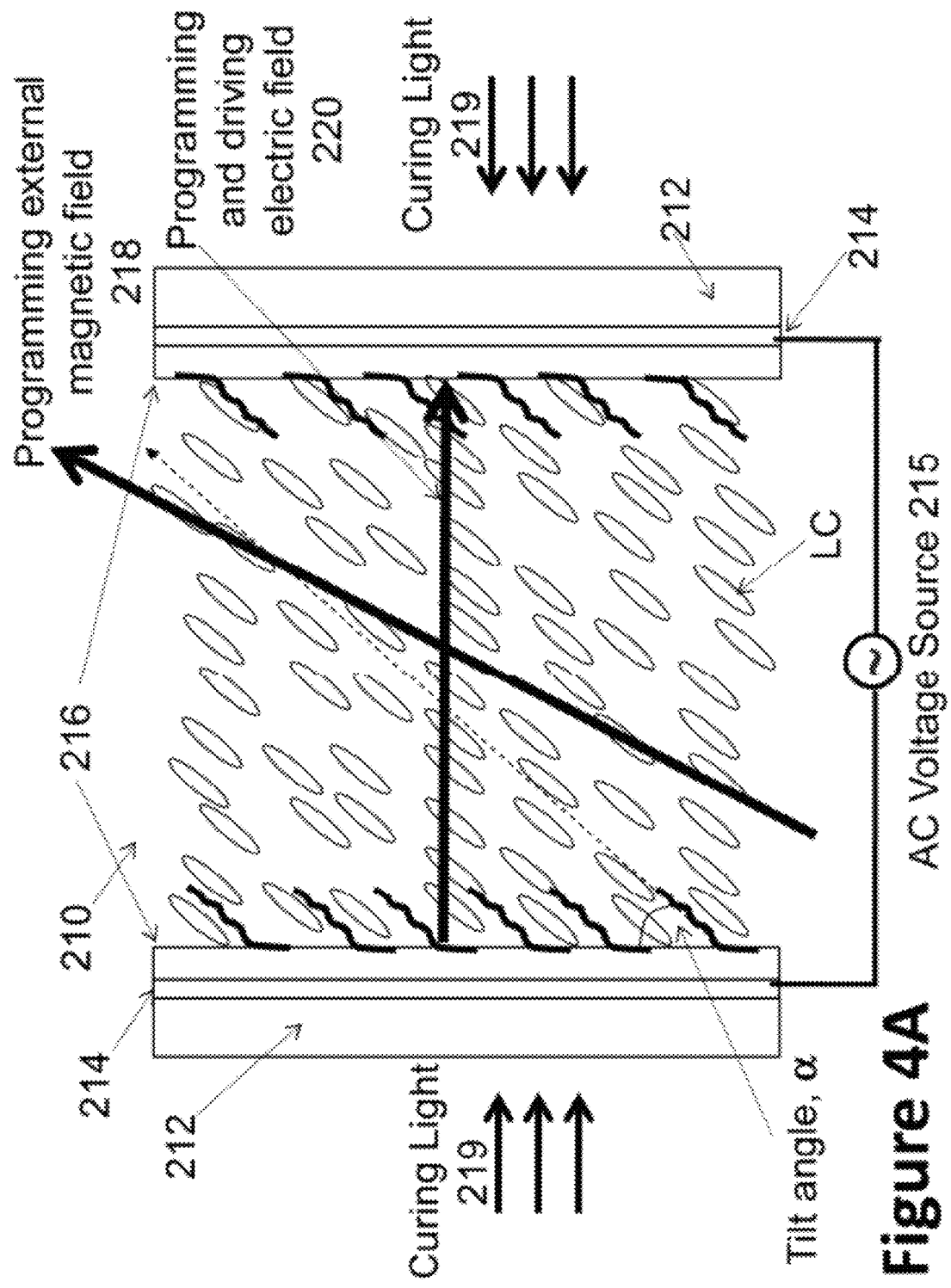
FIG. 4A is a schematic diagram illustrating a side view of another implementation in which the LC cell possesses transparent electrodes that are used to help form the programming electric field.
Figure 4B:
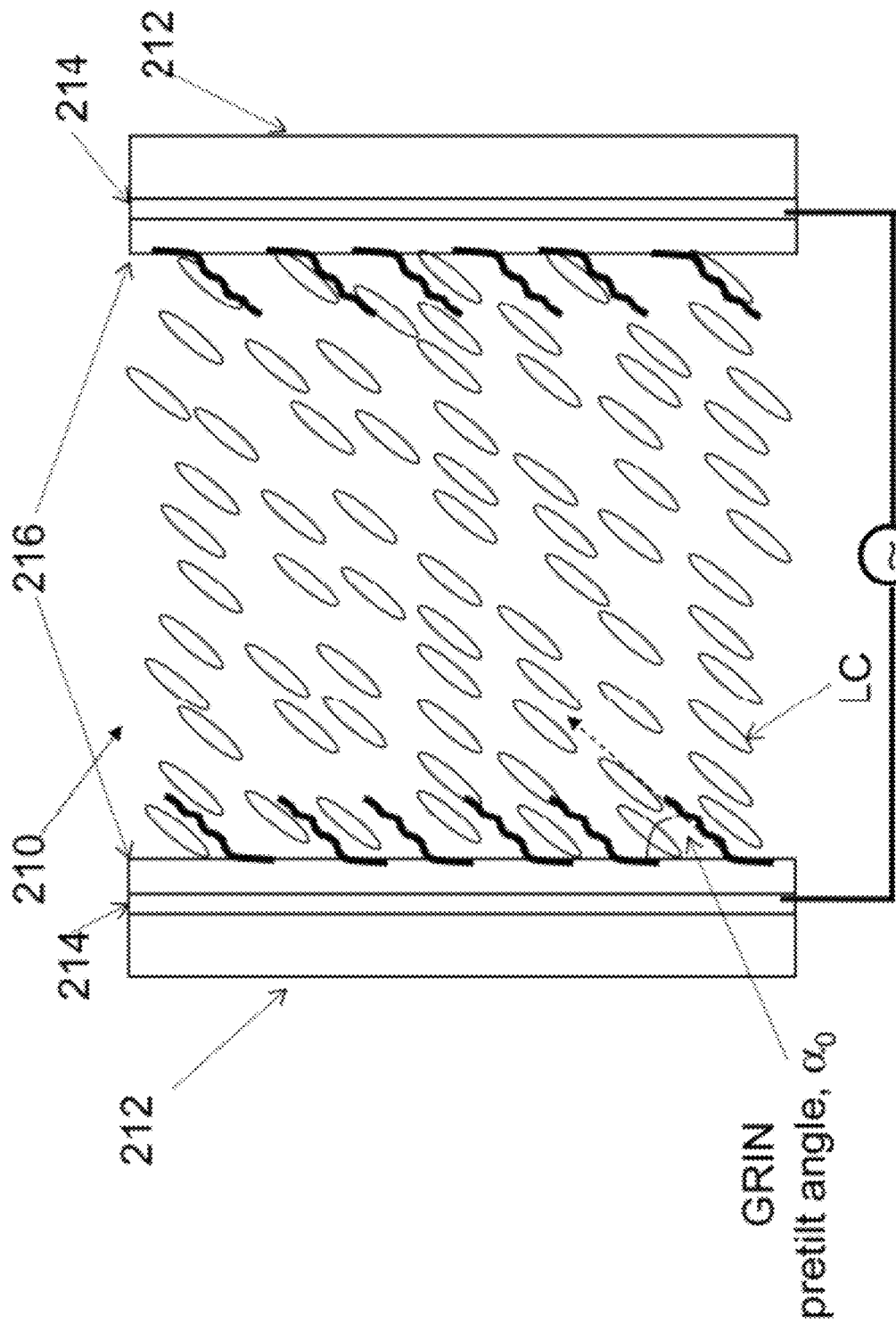
FIG. 4B is a schematic diagram showing a side view of the surface programmed LC cell with transparent electrodes in accordance with the implementation of FIG. 4A.

In the embodiment of FIG. 4A the cell 210 comprises electrodes 214 that can be used to help program the layer 216 along with the magnetic field 218. However, additional external fields (such as magnetic or optical) may be used to achieve the desired pretilt angle with or without the use of the control field. The distance between the electrodes 214 being smaller than electrodes of an external programming field, the voltages required would be smaller compared to the pervious programming method (although the programming of the pretilt itself might be more efficient in the previous case). FIG. 4B illustrates the resulting cell 210 having the desired pre-tilt that forms a gradient index (GRIN) lens.

Note that the orientations and relative strengths of programming fields may be different depending upon the physical parameters of the LC and programming layer, for example, their dielectric or magnetic susceptibilities and their anisotropies. Thus, the LC molecules would be aligned along the excitation field (for example, electric) if they possess positive anisotropy of corresponding susceptibilities (for example, $\Delta\varepsilon = \varepsilon_\parallel - \varepsilon_\perp > 0$) and, vice versa, their axis would be repulsed from the excitation field (e.g., electric), if that anisotropy is negative $\Delta\varepsilon < 0$. Clearly, in a scenario, where the driving electrode positions (and hence, the orientation of the driving electric field) are fixed, that would impose a corresponding choice of the LC. In the meantime, the fact that the second field (e.g., magnetic) is going to be used only for programming, then the anisotropy of the diamagnetic susceptibility of the LC $\Delta_{\chi LC}$ or of the programmable layer $\Delta_{\chi PL}$ would allow a wide choice of possible programming geometries.

In some implementations, the foundation of the substrate 216 is a rubbed surface (e.g. polyimide) to give a conventional uniform low angle pretilt, while in other embodiments, the foundation is not ordered. In the case of an unordered foundation, the programming field 218 is used to set the direction of the molecules and thus set the order. In the case of an ordered foundation, the application of the programming field causes a deviation from that ground state orientation to achieve the desired pretilt. This can be easier to achieve since the ground state provided passively by the rubbed surface is very well ordered. The field strength to impart a deviation can be lower than would be required to order the molecules at the substrate 216 surface that are otherwise unordered.

It will also be appreciated that programming can be performed on a coating 216 in the absence of the cell's LC, on the coating 216 with the cell's LC present during programming, or on the coating 216 with LC present during programming with a change of LC prior to use of the cell 210. The programming field can act on the LC in the cell with the result that those molecules orient those at the surface 216, or it can act only on the molecules at the surface 216, or a combination of both.

Figure 5C:
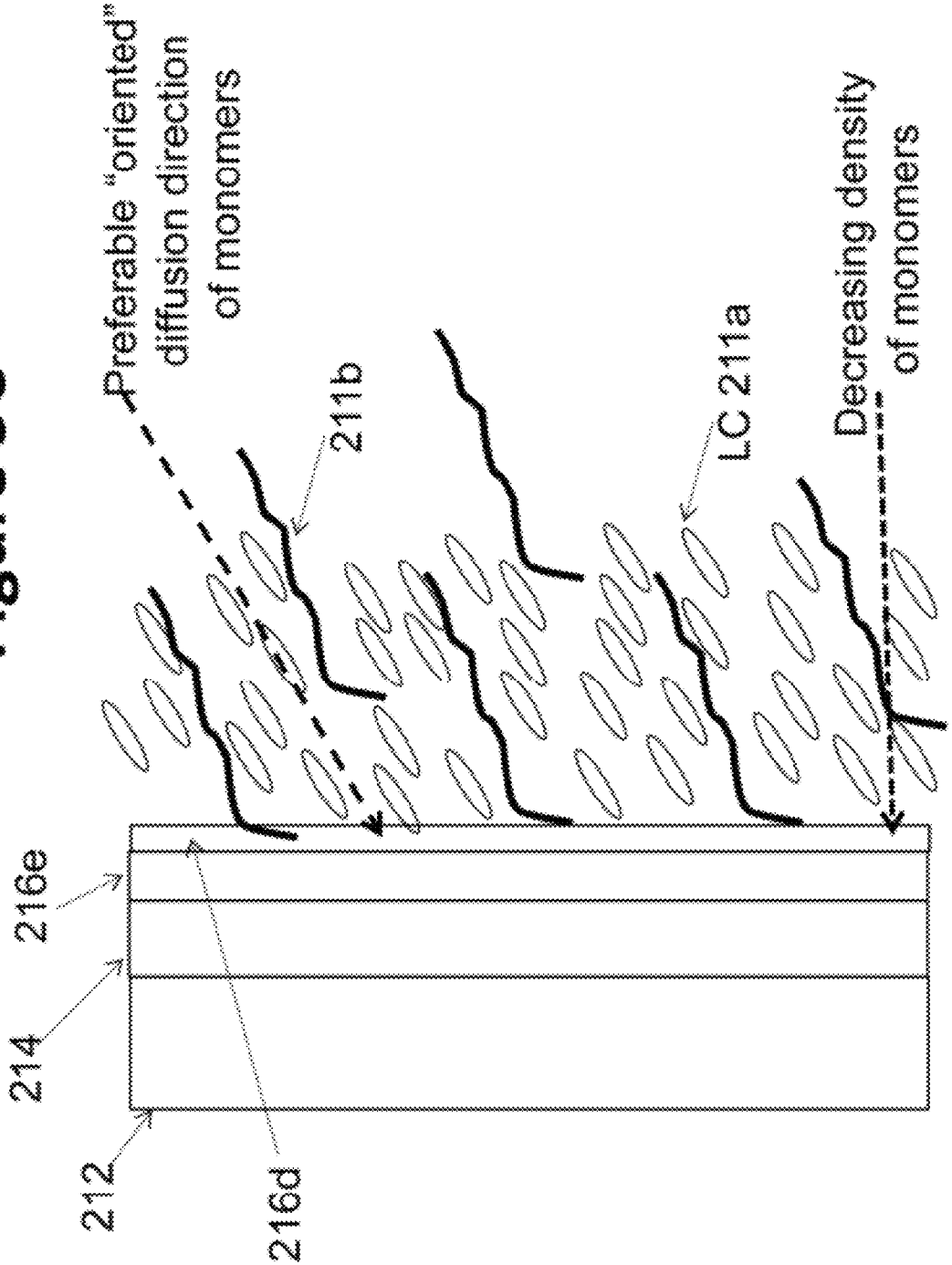
FIG. 5C illustrates schematically an enlarged side sectional view of the alignment surface area showing surface programming by the initiation of the polymerization process via the deposition of a thin layer of an initiator (photo, thermal, or other types)

FIG. 5C illustrates the use of thin initiator layer 216d (thermal, photo or other type) that is deposited (by well known in the art methods of spin, dip or other types of coatings) on the surface of the substrate 216 to initiate the polymerization process near to that surface. The coating 216d can be done directly on the substrate or a transparent electrode 214 or on an optional intermediate layer 216e that could improve the alignment of LC molecules 211a, such a rubbed polyimide coating. In this case, reactive monomers/species 211b (that have been described above to form the programmable layer) can be simply mixed or dispersed in the bulk of the LC. Then, the polymerization process would preferentially start near to the initiation layer 216d, near to the cell substrate. If the polymerization speed is of appropriate value, that would allow the diffusion of those monomers/species towards the surface of the LC cell and their "attachment" to the surface and the formation of preferably inter-diffused (with LC) programming layer. In this case, the reactive molecules (e.g. reactive mesogenes) can be doped in the LC volume. Then, the initiation of polymerization will create a decrease of monomer concentration near to the surface, which, in turn, will force the migration (diffusion) of reactive monomers of the volume to diffuse towards the surface and to "join" the surface polymerization process. The use of reactive mesogenes here can also be very useful since their diffusion will be already directional (in good angular correlation with LC molecules). The liquid crystal mixture can also contain inhibitors to minimize the volume polymerization, while the surface layer 216 contains initiators allowing the polymerization to take place near to the surface layer attaching the created network to surface layer.

Figure 6:
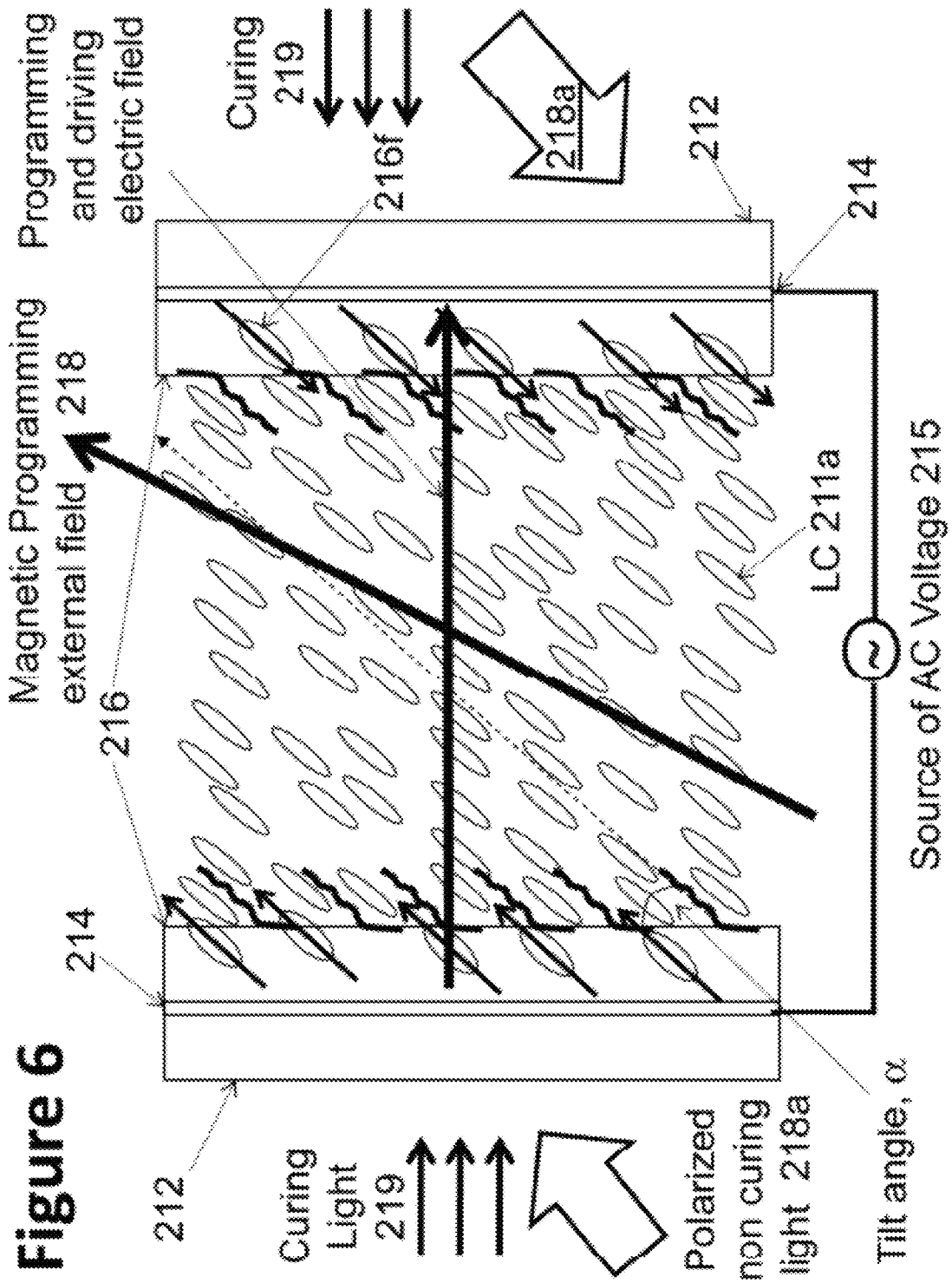
FIG. 6 is a schematic diagram illustrating a side view of another implementation in which the programmable alignment layer coating is doped by photo anisotropic materials (reorientable by the action of the polarization of light) demonstrating a possible geometry of surface programming using the combined effect of external field and light, in a programmable material system.

In one implementation, the additional, programming enhancing species may be photo-alignable molecules, such as azobenzene molecules (an azo dye). This is illustrated in FIG. 6 in which molecules 216f are within the programmable layer 216. Photo excitation of those molecules can bring to the reorientation of their lengthwise axis into the perpendicular (with respect to the electric field of light) orientation. In the particular case of circularly polarized light excitation, the molecular axes are reoriented in the direction of light propagation [see A. Yavrian, T. V. Galstian, M. Piché, Circularly polarized light induced rearrangement of optical axes in photoanisotropic recording media, Optical Engineering 41(04), 852-855, 2002] which is incorporated herein by reference. Thus, linearly or circularly polarized light of the appropriate wavelength and propagation direction can be used to achieve a desired uniform or non uniform (with the help of light intensity distribution) orientation of those species. The above-described electric and magnetic fields, as well as material arrangements can be used to improve the alignment efficiency. The polymerization process of reactive species, that are present in the system, can then be started to maintain (at least partially) the obtained orientation. The influence of orientational programming would be higher, if there is a strong orientational correlation of those dyes with host molecules (of the programmable layer) and with molecules of LC.

Figure 5D:
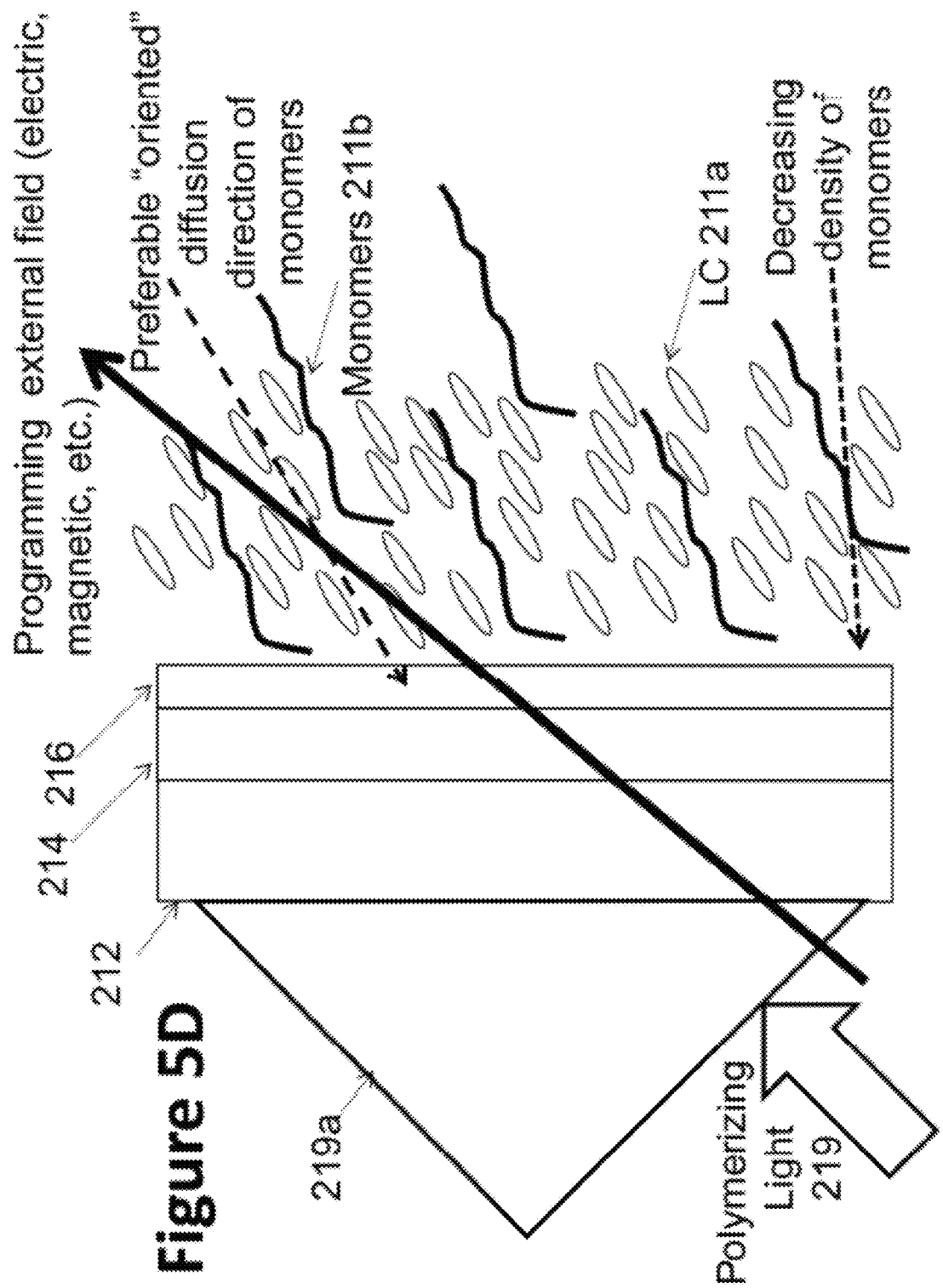
FIG. 5D is a view similar to FIG. 5C illustrating a similar, surface polymerization process, however without the surface layer of initiators, in which the polymerization initiation process is started by the evanescent field of light.

In FIG. 5D, there is shown a schematic illustration of a similar, surface polymerization process however without the surface layer of initiators. The polymerization initiation process here is started by the evanescent field of light. The diffusion and orientation concepts remain similar to the previous case of FIG. 5C. The curing light comprises a source 219 and optics 219a to support the polymerizing light propagation and formation of the evanescent field.

In FIG. 6 there is shown a schematic demonstration of a geometry of surface programming using the combined effect of external field and light, in a programmable material system where the layer is doped by photo anisotropic materials 216f (reorientable by the action of the polarization of light). This implementation uses the inter diffusion of LC molecules (with the programmable material molecules) and the use of an additional external field. The inter diffusion of LC molecules (with the programmable material molecules) and the use of additional external field here is a differentiator with previous implementations.

Circularly polarized light has been demonstrated to create a substantially 90° pretilt in a layer 216 that was formed by a spin coating of reactive mesogene monomers 211b and azo-dye 216f deposited on a rubbed polyimide foundation substrate. The circularly polarized light was shone in a direction perpendicular to substrate to orient the dye molecules vertically on the surface, thus directing the monomers in the same direction. These oriented monomers were then polymerized using UV light. On the same surface, the pretilt angle was near zero where the circularly polarized light was masked, thus demonstrating the ability to program pretilt and in a spatially modulated manner.

When light is used as the programming field, and in particular polarized light, it can be important to direct light onto the alignment layer being formed from above instead of through the substrate, since the substrate can create anisotropy in the light field.

Figure 7A:
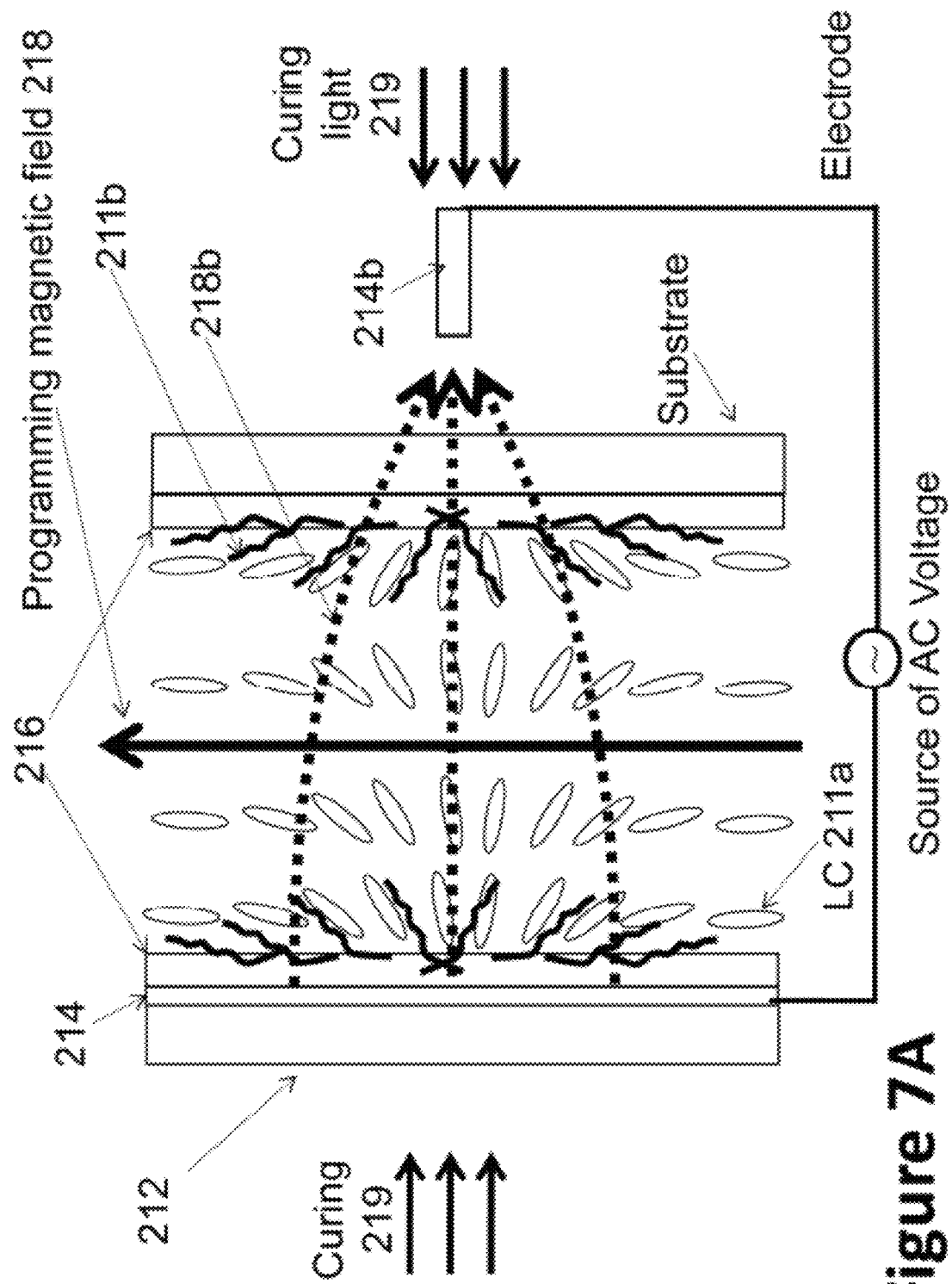
FIG. 7A shows a schematic cross-sectional diagram of a liquid crystal cell having a spatially non-uniform electric field that is used to program the alignment layer to have a lensing effect in the ground state.
Figure 7B:
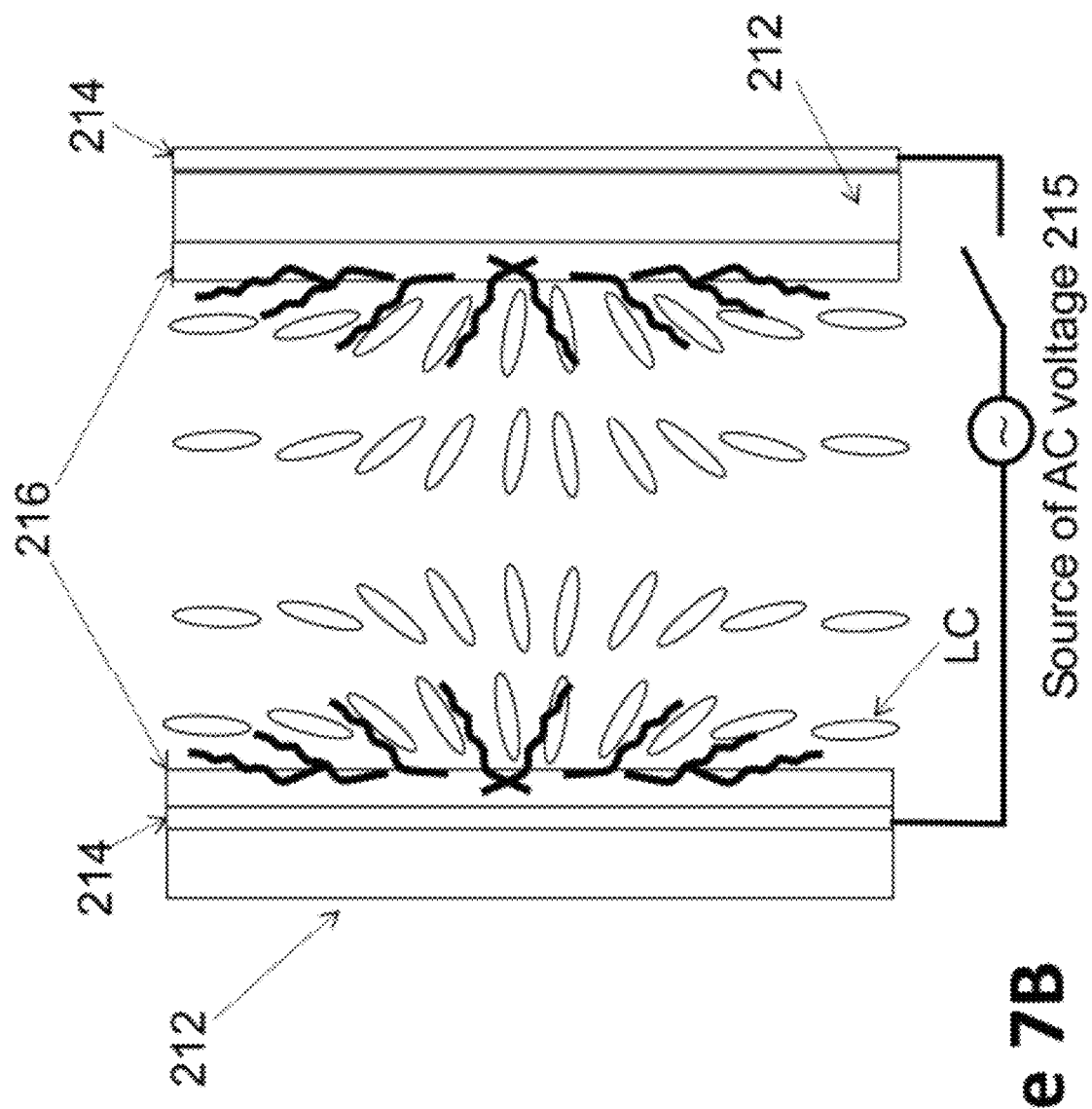
FIG. 7B shows a schematic cross-sectional diagram of the liquid crystal cell having programmed alignment layers of FIG. 7A arranged with planar electrodes that act on the liquid crystal to reduce the lensing effect of the cell with higher electric field.

For example, FIG. 7A shows a schematic cross-sectional diagram of a liquid crystal cell 210 having a spatially non-uniform electric field 218b that is used to program the alignment layer to have a lensing effect in the ground state. This is a refractive, gradient index lens. To fabricate a diffractive lens, the use of light to orient the molecules during programming, as in FIG. 6, can be easier with respect to the spatial modulation of the programming field. Such a lens can have its full optical power in the ground state, or any desired ground state optical power.

While the proposed solution has been described with respect to focus correction, the invention is not limited thereto. It will also be appreciated that the ability to spatially program the pretilt of the alignment layers can allow for custom design optical trim elements. For example, in order to correct for astigmatism errors, coma errors, optical axis shift errors and optical axis reorientation errors, different oriented layers may be deposited and then additionally treated by light while using point or ring electrodes to create spatially non uniform alignment layers to compensate for such distortions and/or aberrations qualified and quantified by wafer testing. Such optical trim elements can be singly configured while wafer scale fabricated to have a specific pretilt spatial programming.

As another example, a parametric lens can be fabricated as a TLCL having a segmented electrode described hereinabove. In this implementation, the optical trim element including a parametric lens fabricated as a TLCL having a segmented electrode enables camera module testing and calibration with the optical element in situ.

Again, the resulting camera module array is operationally tested and the camera module array proceeds to singulation.

Figure 20:
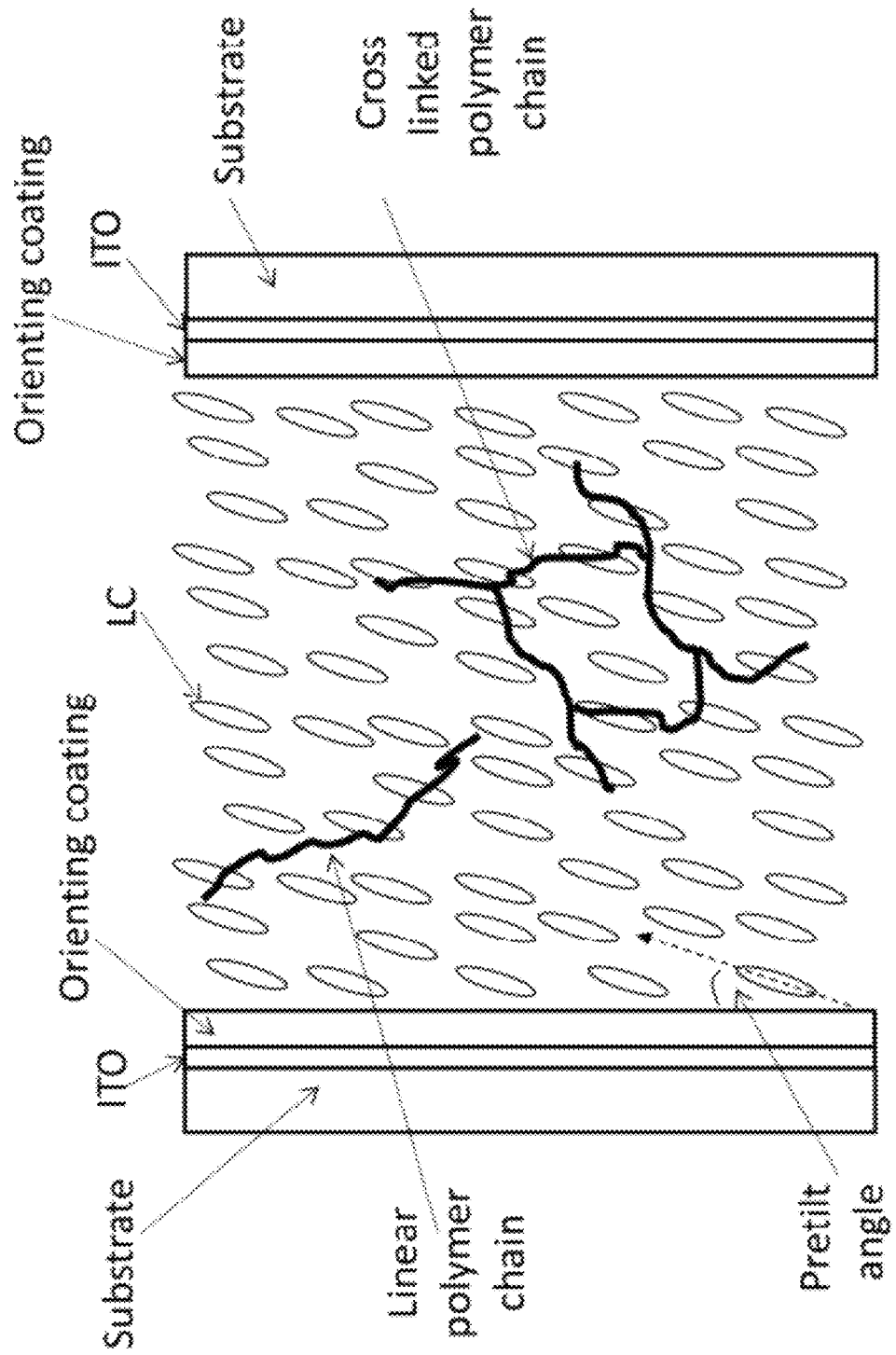
FIG. 20 is a schematic diagram illustrating a side view of a uniformly oriented LC cell filled with linear and/or cross linked volume dispersed polymer stabilized liquid crystal in the ground state, wherein similar features bear similar labels throughout the drawings. While the layer sequence described is of significance, reference to "top" and "bottom" qualifiers in the present specification is made solely with reference to the orientation of the drawings as presented in the application and do not imply any absolute spatial orientation.

For certainty, the use of reactive mesogenes described above is not intended to limit the invention. A fixed optical power TLCL having a segmented electrode can be fabricated to include a liquid crystal layer doped with a monomer, and once the desired optical power is determined, to cause polymerization (e.g. using light initiation or temperature) of the monomer to fix the liquid crystal. Such a Polymer Stabilized Liquid Crystal is described in U.S. Pat. No. 7,218,375 entitled "Electrically Variable Focus Polymer-Stabilized Liquid Crystal Lens Having Non-Homogenous Polymerization of a Nematic Liquid Crystal/Monomer Mixture" issued on May 15, 2007 to Tigran Galstian, Vladimir Presniakov, Karen Asatryan and Amir Tork. With reference to FIG. 20, the use of, such polymer-stabilized liquid crystals (PSLC) can be used to "program" the alignment and the reorientation of LC molecules, with (e.g., an electric field) or without the use of external excitation means for that programming so as to correct optical distortions and aberrations including at least one of optical power insufficiency, astigmatism error, coma error, optical axis shift error and optical axis reorientation error. The material system and the programming method used creates a "floating" polymer network of spatially variable density in the volume of the cell, wherein the density impacts the ability of the LC to align with a modulating field. In particular, such optical trim element programming can be provided by applying a spatially modulated electric field to a nematic liquid crystal/monomer mixture or a reactive mesogene within a liquid crystal cell of a TLCL having a segmented electrode employed in modulating the electric field, and simultaneously irradiating the nematic liquid crystal/monomer mixture or the reactive mesogene with a uniform intensity light field so as to induce formation of a spatially non-homogenous polymer network structure within the cell. Alternatively, such optical trim element programming can be provided by applying a substantially uniform electric field (including a zero electric field) to a nematic liquid crystal/monomer mixture or a reactive mesogene within a liquid crystal cell; and simultaneously irradiating the nematic liquid crystal/monomer mixture or reactive mesogene using a light field (for example a laser beam) having a shaped intensity distribution so as to induce formation of a spatially non-homogenous polymer network structure within the cell. For certainty, light polymerization is not intended to limit the invention, other means of polymerization can be used.

Wafer Level Manufacturing Based on a Liquid Crystal Lens Substrate

In accordance with a further embodiment of the proposed solution, wafer level manufacture of focus-free camera modules is centered around a lens structure including wafer fabricated Tunable Liquid Crystal Lens (TLCL) arrays in place of the discrete fixed optical lenses of the previous embodiments.

A liquid crystal optical device array on a wafer is used to build up a camera module array from which a plurality of camera modules may be singulated. The proposed solution thus provides a substrate for the discrete components that is an active optoelectronic structure allowing wafer level fabrication of complex optoelectronic devices at the wafer level.

A method of wafer level manufacturing of a multitude of camera modules by first fabricating a wafer-level component structure layered on an array of liquid crystal optical devices is provided. This wafer-level structure includes a liquid crystal layer and a multitude of electrode layers for applying an electric field to the liquid crystal layer. A multitude of optical components are affixed to a surface of the component structure, each in a different predetermined location of the surface. Predetermined regions of the resulting camera array are then separated so as to singulate a multitude of camera modules therefrom, such that each camera module includes a wafer-level fabricated camera module assembly and at least one optical trim element affixed thereto.

Arrays of optical components affixed to the surface of the wafer-level TLCL structure may include fixed lenses, image sensors or a combination of the two. The components may also be affixed to one or both of two different surfaces of the wafer-level TLCL component structure. For example, fixed focus lenses can be affixed to the structure on both a first surface and a second surface such that a finished singulated camera module includes a fixed lens on either side (each side corresponding to one of the primary surfaces of the wafer-level component structure). Similarly, fixed lenses may be affixed to a first surface, while image sensors are affixed to a second surface, such that the singulated devices include a fixed lens on one side of the device and an image sensor on the other side. The singulated devices in such a case may therefore require only minor finishing additions, such as electrical leads, to be functional as focusable camera devices.

More specifically wafer level manufacturing of camera module arrays begins with wafer level fabrication of electrically controllable liquid crystal optical devices, such as those described in the following international patent applications, the subject matter of which is incorporated herein by reference: PCT Application No. PCT/CA2009/000743; PCT Application No. PCT/IB2009/052658; PCT Application No. PCT/CA2009/000742. Each of these earlier applications describes liquid crystal structures that can be suitable for the type of wafer level fabrication described herein.

Figure 8:
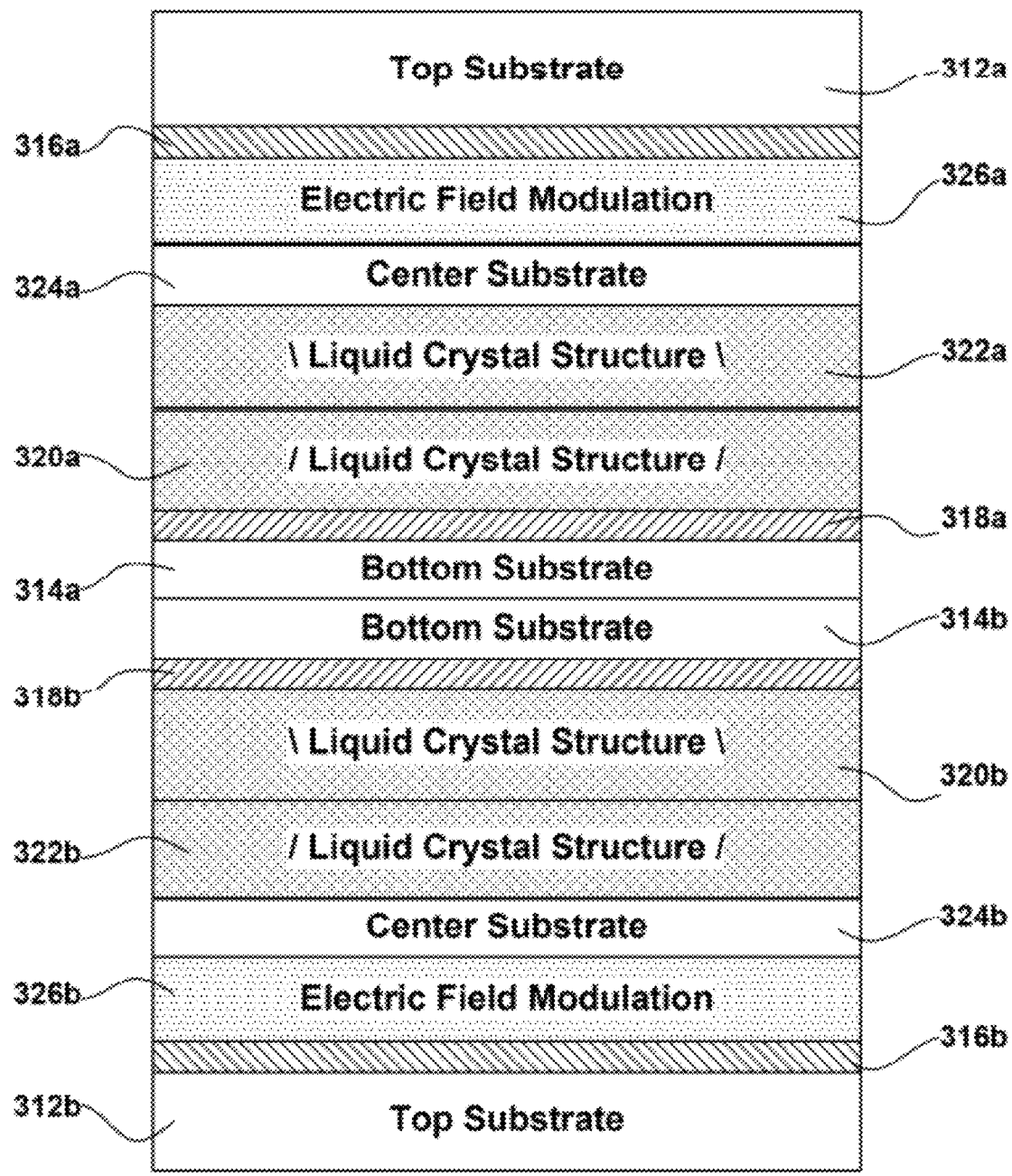
FIG. 8 is a schematic illustration (not to scale) showing a side view of a wafer-fabricated, singulated, four liquid crystal layer variable optical power lens embedded in a flat substrate in accordance with a third embodiment of the proposed solution.

Shown in FIG. 8 is a fixed focus Tunable Liquid Crystal Lens (TLCL) structure wafer level fabricated in accordance with the proposed solution. This structure includes two TLCL half wafers fixed together, the two wafers having a rotation of ninety degrees relative to each other, such that each half TLCL operates on a different polarization of light. Each TLCL half, however, is otherwise identical, and identical components of the two halves are therefore represented using the same reference numeral.

The TLCL structure of FIG. 8 is a wafer fabricated TLCL device having two halves, each of which includes a top substrate 312, a bottom substrate 314, conductive layers 316, 318 liquid crystal structures 320, 322, center substrate 324 and electric field modulation layer 326. The use of two liquid crystal structures 320, 322 in each half, each LC structure having a different crystal alignment, compensates for the non-uniform response that would result if a single layer were used, due to the different interaction of the liquid crystals with light originating from different directions. It should be understood that, while shown schematically in FIG. 8, the lens structures 320, 322 each include not just a liquid crystal, but also additional multiple materials necessary to support the liquid crystal layers, including one or more substrates between the lens structures 320, 322.

Figure 10:
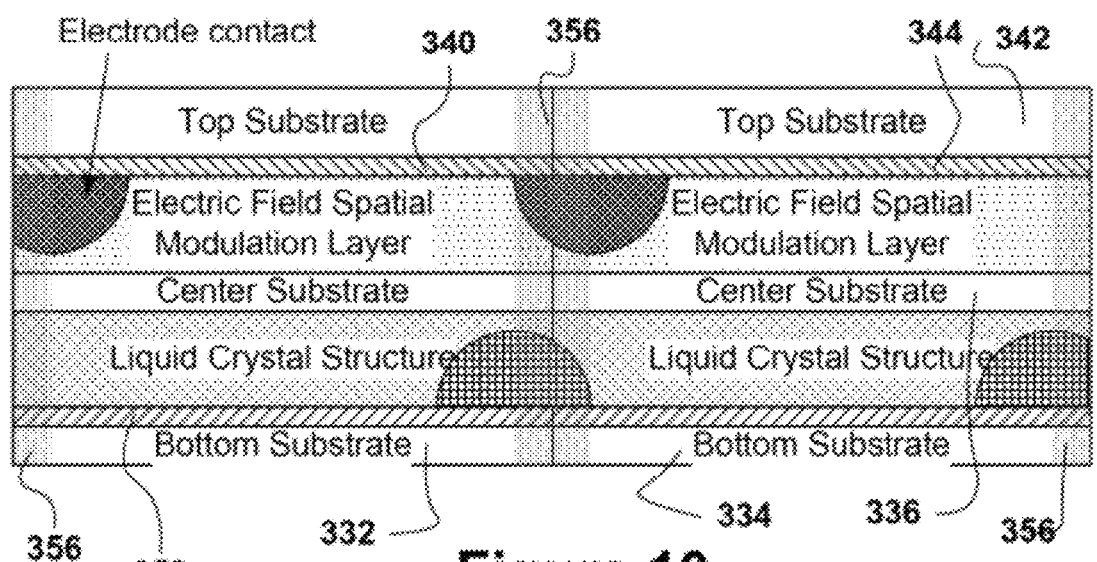
FIG. 10 is a schematic diagram illustrating a side view of a wafer structure equivalent to one half of the tunable liquid crystal lens (TLCL) of FIG. 8.

The wafer level fabrication process may be understood with reference to FIG. 10, which shows a implementation including two adjacent wafer fabricated TLCLs. Those skilled in the art would understand that a typical wafer includes an array of more, and typically many more, than two TLCL, and that the configuration of FIG. 10 is only for illustrative purposes. The fabrication process starts with a bare glass substrate, namely, bottom substrate 332. The glass used for the substrates of the device is typically a borosilicate glass which is manufactured in very thin sheets, 100 microns or less. The glass is cleaned using processes recommended by the glass manufacturer. These include a combination of detergent soaks, ultrasonic cleaning, and deionized water rinses. The clean glass is then coated with a transparent conductive thin electrode layer 334. Typically, this electrode is an Indium Tin Oxide (ITO) which is sputter deposited, although other thin film deposition techniques, such as evaporation, may also be used. It may be desired to use a patterned electrode for this lower electrode, and to obtain a patterned electrode the conductive electrode 334 may be deposited through a shadow mask, where the areas not to be coated are blocked by a (metal) mask.

The next step is to fabricate the liquid crystal (LC) cell. The bottom substrate 332 and center substrate 336, which can also be a glass wafer, form the upper and lower support surfaces for the LC cell, and are coated with an alignment layer (for the bottom substrate 332 this coating is on top of the electrode layer 334). The alignment layer is not shown in the figure but serves to align the liquid crystal molecules in a common, predetermined orientation. Typically, this will result in a surface with some microscopic texture. The coating layer may be a polyimide layer which is later textured by rubbing with a cloth or may be an oxide film which is deposited in a manner which results in a highly textured surface. A more detailed description of the alignment layer is presented herein with reference to the parametric lens embodiment.

After the textured surface is formed, the cell itself is wafer fabricated. In an exemplary embodiment, three materials are deposited on one of the glass wafers that form the LC cell, and these materials are shown collectively in FIG. 10 as the liquid crystal structure 338. The first material is any additional conducting material. This is often a conductive adhesive or solder. A nonconducting adhesive is also deposited to define the area to be filled with liquid crystal material. Nonconductive adhesives include acrylic, epoxy, or silicone materials. Finally, the liquid crystal material is deposited. In one or more of the materials deposited, spacers are included. The spacers are typically glass or polymer spheres of a tightly controlled size which act to set the thickness of the LC cell. Finally the second glass wafer (e.g., the center substrate 336) (optionally including an alignment layer) is placed on top of the dispensed materials and the adhesive materials are cured using heat, pressure, and/or light. Those skilled in the art would understand that this is just one specific example of a liquid crystal cell, and that the invention applies equally to liquid crystal cells having other materials and/or configurations and/or processes of manufacture.

Electric field spatial modulating (electric field "lens") structure 340 is fabricated on a third glass wafer, namely, top substrate 342, which has already been coated an electrode layer 344. As with the electrode layer 334 of the bottom substrate, the electrode layer 344 of the top substrate may be patterned if desired. Possible electrode contacts are also shown in FIG. 10. The modulating structure 340 applied to the top substrate is typically fabricated from polymer layers with varying electrical and optical properties. Alternatively, patterned electrodes and complex conductivity materials can be used alone or in combination to provide the desired electric field spatial modulation. For example, in one embodiment, the electric field modulation layer includes a predetermined distribution of frequency-dependent permittivity material that results in a desired spatial distribution of electric field strength. Such frequency-dependent materials may be used alone or in combination with patterned electrodes. Additional conductive materials (such as conductive adhesives and solders) and structural material (such as glass, polymer, or metal spacers) may be incorporated. While the proposed solution has been described with reference to optical power insufficiency, the invention is not limited thereto. Such patterned electrodes can be employed to address astigmatism errors, coma errors, optical axis shift errors and optical axis reorientation errors. Tunable Liquid Crystal Lenses having a movable optical axis are described in co-pending U.S. Provisional Patent Application 61/289,995 entitled "Image Stabilization And Shifting In A Liquid Crystal Lens" filed Dec. 10, 2009, the entirety of which is incorporated herein by reference.

Figure 11:
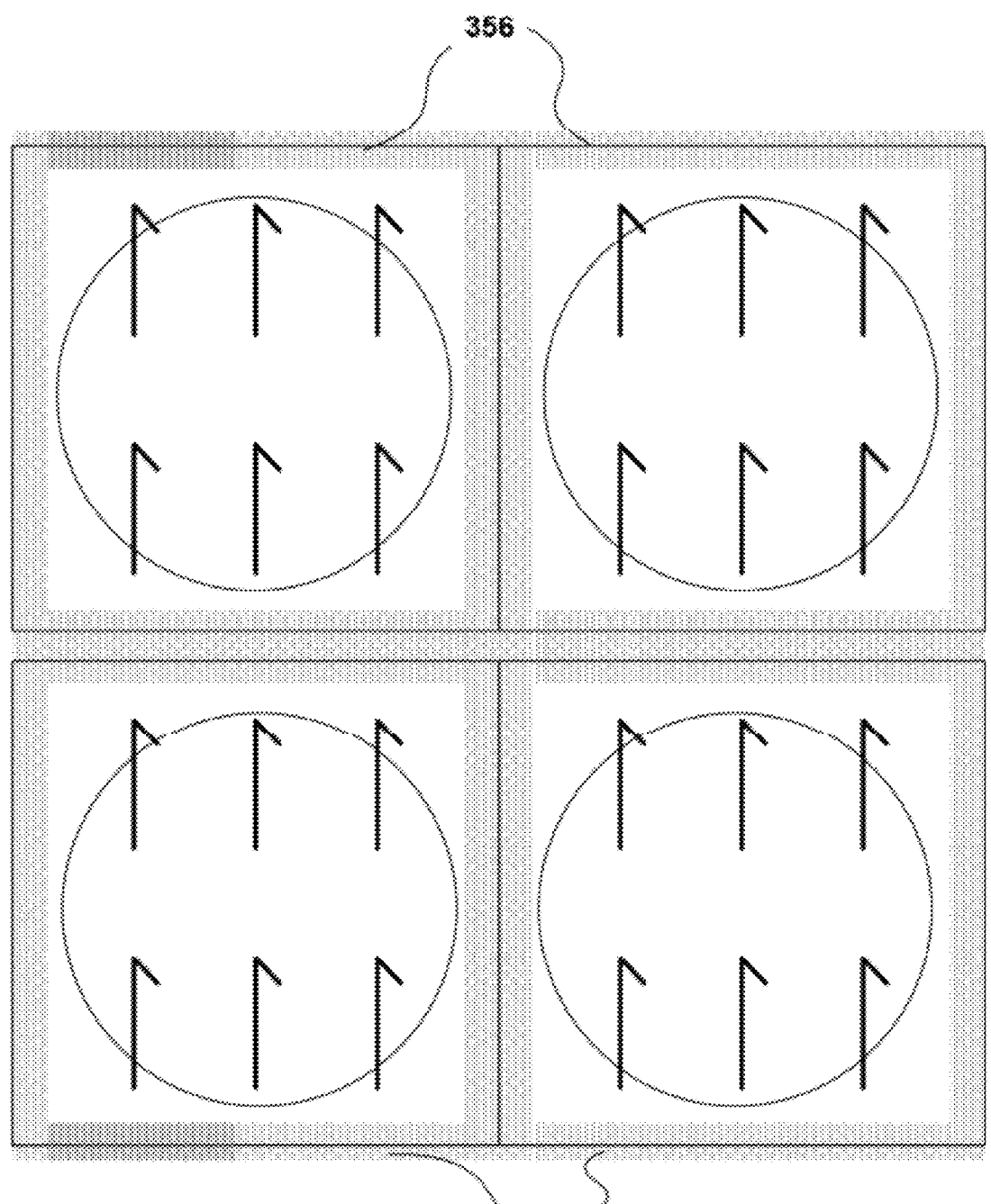
FIG. 11 is a schematic diagram illustrating a top view of the implementation of FIG. 10 showing four cells in a two-by-two array of a wafer.

After being fabricated, the top substrate 342 electrode coating 344 and electric field modulation layer 340 are bonded to the LC cell using an optical adhesive material. At this point, a TLCL has been fabricated that operates on one (single) polarization of light. However, as discussed below, this structure may represent just one half of a TLCL fabricated in wafer form, as another such structure may be added to create a TLCL that operates on two orthogonal polarizations of light. FIG. 11 is a top view of an array of half TLCL structures of FIG. 10 on a wafer, with indications of the single polarization direction affected by the liquid crystal layers (FIG. 11 shows only a four half TLCL device array of the wafer but, as mentioned above, an actual wafer-level fabrication would typically include many more such half TLCL structures).

Creating a polarization insensitive (full polarization) TLCL involves bonding two half (single polarization) TLCL wafers together. The two wafers are placed with their bottom substrates back to back, as is shown in FIG. 8. In addition, one wafer is rotated 90 degrees relative to the other, so that the alignment of the LC cells in each half TLCL is at 90 degrees to the other. Each half TLCL acts on one polarization of light, and the combination of the two polarization orientations allows for the TLCL to operate without polarization dependence. An optical adhesive is placed between the two wafers and the wafers are aligned such that the optical axes of the individual devices in each wafer are aligned (collinear). The optical adhesive is then cured using heat, pressure and/or light.

Figure 9:
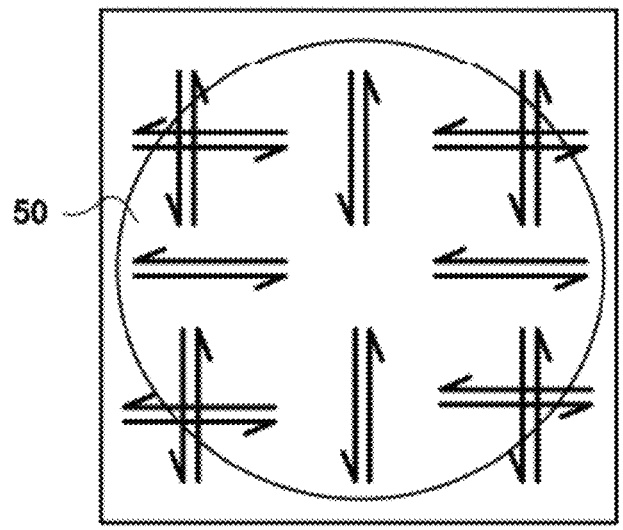
FIG. 9 is a schematic diagram illustrating a top view of the implementation of FIG. 9 showing the orientation of light polarization and rubbing directions.

Liquid crystal molecules interact with light differently as a function of orientation with respect to the direction of light propagation. Therefore the optical property of the liquid crystal is different as a function of angle of incidence on the TLCL. To reduce this effect, each half TLCL can alternatively contain two LC layers, namely each one with its alignment layer having its directors pointing at the same angle but in an opposite direction to the other. In this way, each half TLCL is less dependent on the angle of incidence of light. Such a configuration is shown in the embodiment of FIG. 8. Thus, the full TLCL wafer has a total of four embedded liquid crystal layers. This is also indicated in FIG. 9, which is a top view representation of the embodiment of FIG. 8, including indications of the resulting polarization in orthogonal axes with the split cells providing liquid crystal orientation in both directions along each axis.

Figure 12:
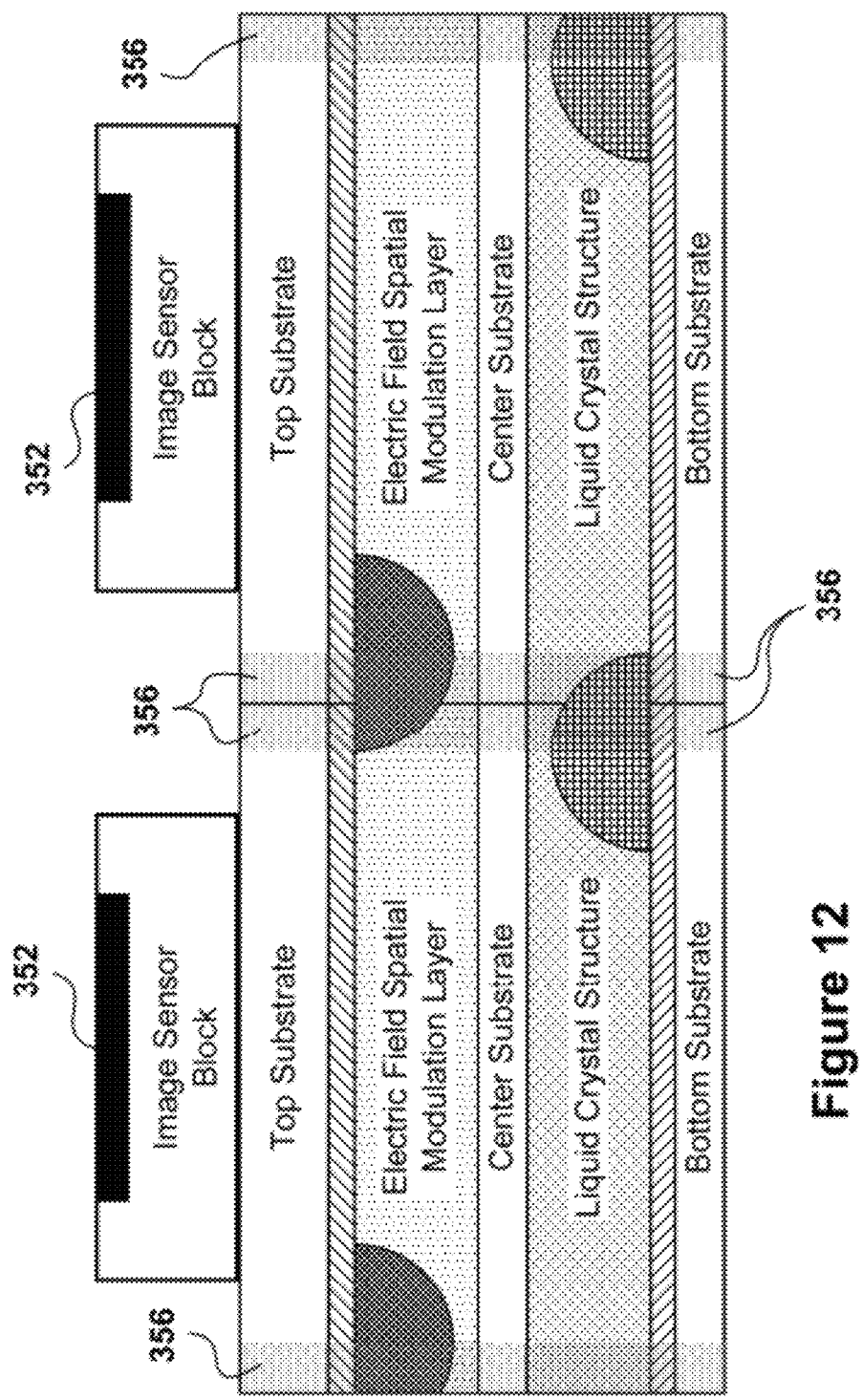
FIG. 12 illustrates schematically the bonding of image sensors to a substrate having an embedded liquid crystal optical device.
Figure 13:
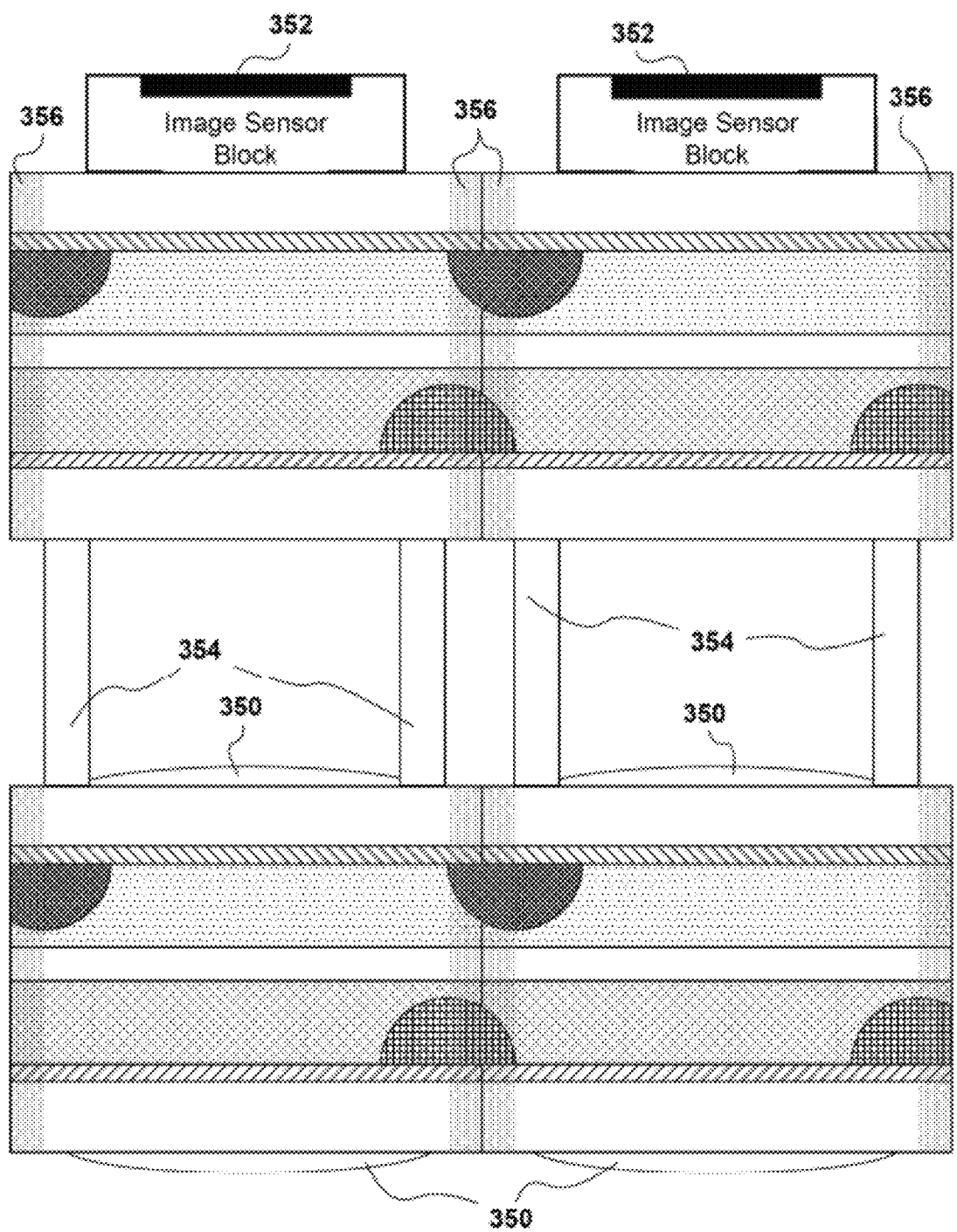
FIG. 13 illustrates schematically a liquid crystal optical device substrate carrying lens structures on its surfaces and mounted with an imaging sensor carrying substrate also having a liquid crystal optical device embedded therein.

FIG. 12 illustrates the wafer level assembly of image sensors with TLCL structures. An image sensor block 352 is integrated into each of the array of TLCLes (structures) on a wafer by bonding an image sensor block 352 to a surface of each TLCL. The actual image sensor plane within the image sensor block 352 is positioned at an appropriate distance from the rest of the lens structure to allow detection of an image focused by the liquid crystal lens, as described in the previous embodiment(s). Additional TLCL wafers can be assembled to the camera core array to provide lens structures via spacers 354 as shown in FIG. 13. For certainty, spacers such as spacers 354 can be employed to space the image sensor block 352 from the TLCL.

At this point the camera module core array is tested and any optical errors are qualified and quantified. Configuration parameters are obtained by testing the camera module core. In this sense testing provides calibration.

In accordance with one implementation, TLCL liquid crystal optical devices of an lens structure array can be a fixed focus lenses without being electrically controllable. This can be particularly useful for making camera modules. Such liquid crystal lenses may be programmed and fixed (cured) to have specific optical properties, such as optical power and compensating aberration, that may differ from part to part to address errors determined by wafer level testing.

In accordance with another implementation, the half TLCL wafer and/or the full TLCL wafer of FIG. 12 has sufficient mechanical strength to be used as a carrier substrate for receiving an optical trim lens coating (or having a lens etched in the glass substrate) on the top substrate that operates in conjunction with the TLCL portion of the lens structure. The fixed lens may be any type of desired lens, including a positive or negative lens, and in particular a lens for correcting aberration or other ray propagation issues. As discussed below, other components instead of, or in addition to, the fixed lens may also be affixed to the wafer structure as part of the fabricated device.

Figure 14:
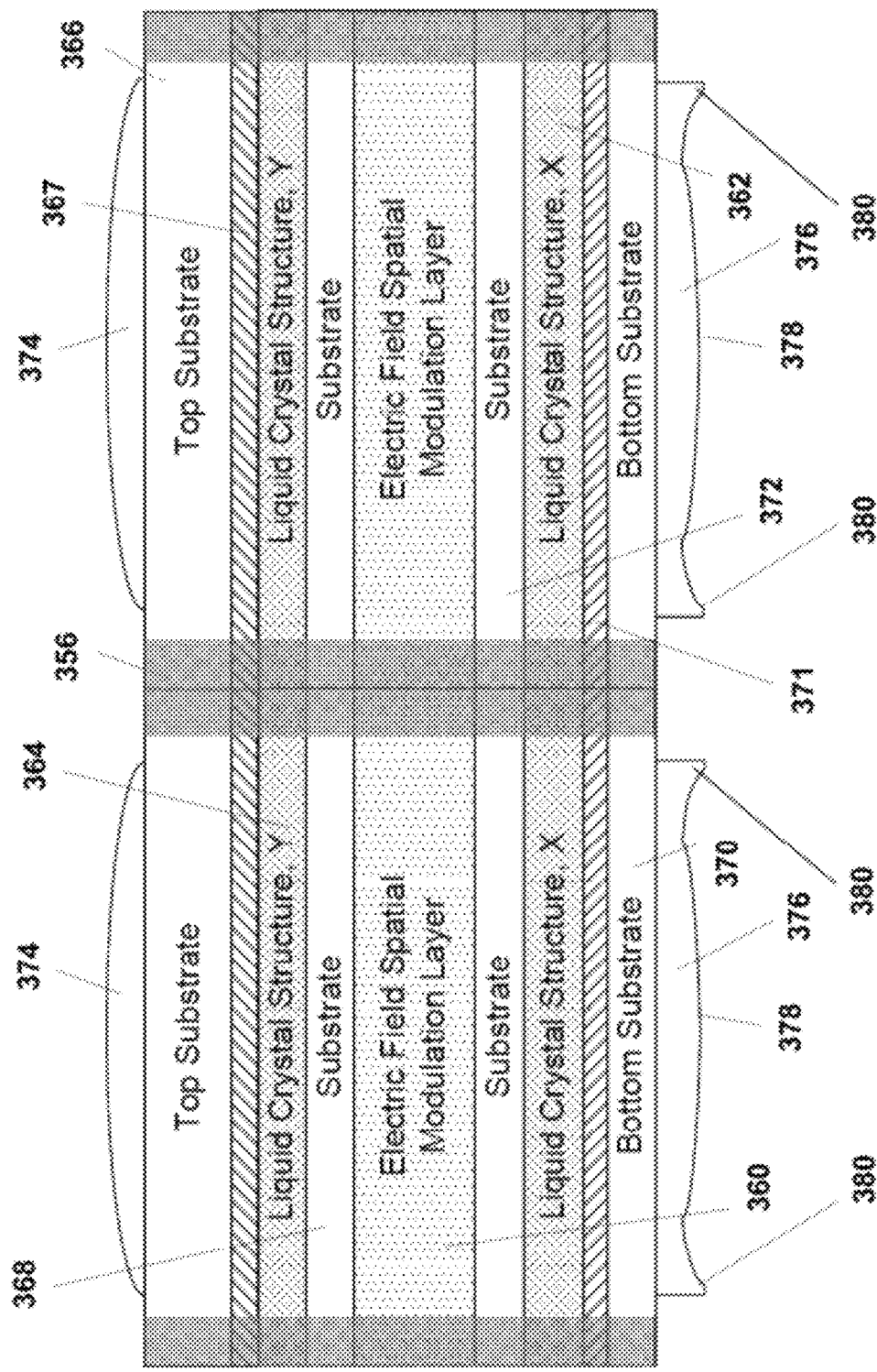
FIG. 14 illustrates schematically an implementation in which an electric field modulating layer of the structure is located between two liquid crystal structures.

In the embodiment of FIGS. 13 and 14, a plano-convex optical trim lens is provided on at least one substrate of each TLCL in the array such that a convex corrective lens is provided. For example, in the embodiment of FIG. 10, a plano-convex lenses 350 are fixed to the top substrate 342 of the TLCL structure.

The location of a fixed lens optical trim element 350 on each half of the TLCL provides similar advantages in the structure of FIG. 8.

Thus, in an embodiment such as this, the fixed optical trim lens 350 is integrated as part of the wafer-level fabrication, thereby allowing the mass production of camera modules.

As mentioned above, in accordance with another implementation, in addition to liquid crystal devices in the lens structure, a "once programmable material" can be placed between thin glass plates and used to provide a fixed optical device, such as a lens. A good example of an application of this is to correct the Chief Ray Angle, which may be desired flowing camera module testing. In such a case, the optical trim element can be used to correct imperfections detected in the whole camera module optical core assembly during manufacturing and prior to singulation. An example of a once programmable material is a reactive mesogene material that can be programmed using an electric or magnetic field and then set using a chemical or radiation initiator.

FIG. 13 illustrates an array of wafer fabricated camera modules including two wafer substrates having embedded liquid crystal optical devices mounted together in a stack to provide a fixed focus lens structure. One wafer has image sensors 352 bonded to one side. The second wafer is mounted via a spacer structure 354 to the first wafer, and the second wafer is also combined with optical trim elements, for example plano-convex lenses 350 for providing the desired corrective optical power for focusing an image on the image sensor. The plano-convex lenses 350 can thus provide a focus adjustment.

The location of the optical trim element lens may be positioned off axis to compensate for optical axis shift error and/or optical axis reorientation error.

FIG. 14 shows an additional TLCL implementation in wafer form, similar to that of FIG. 10, in which an electric field modulation layer 360 is centrally located in the wafer structure between liquid crystal structure "X" 362 and liquid crystal structure "Y" 364. Liquid crystal structure Y is supported between top substrate 366 (which has an electrode coating 367) and substrate 368. Similarly, liquid crystal structure X is supported between bottom substrate 370 (which has an electrode coating 371) and substrate 372. The two liquid crystal structures 362, 364 may be of different configurations, as desired. In one example, each structure includes a liquid crystal and polymer network which together establish a desired spatial distribution of the liquid crystal molecules. The liquid crystal structures may also be liquid crystal layers supported by various substrates and spacers, and may interact with separate frequency-dependent permittivity layers or even frequency-dependent permittivity materials incorporated into the liquid crystal structure. The different electrode layers may also be planar or patterned as may be desired for different applications. Those skilled in the art will understand that the desired functionality of the liquid crystal devices will dictate the manner in which the liquid crystal layers, the supporting substrates, the electrodes and any dielectric materials will be arranged.

As with FIG. 10, FIG. 14 illustrates an implementation which includes discrete components affixed to the wafer-level structure. In the embodiment shown, fixed lenses 374 are located adjacent to the top substrate. In addition, adjacent to the bottom substrate are located fixed lens and standoff components 376. These components each have a central region 378 that operates as a fixed lens relative to the finished liquid crystal device. In addition, these components have integral standoffs 380 that serve as supports for the finished components relative to other elements in the lens structure to which they are mounted. Such a shape may be useful for securing the liquid crystal device to such a structure and/or for providing spacing of the optical components relative thereto.

It should be noted that, using a wafer-level fabrication as described herein, the individual layers may be very thin. A fully functional TLCL may be constructed using outer substrate layers (e.g., substrates 366, 370) each with a thickness on the order of 50-100 μm, inner substrate layers (e.g., substrates 368, 372) each with a thickness on the order of 40-50 μm and liquid crystal structures on the order of 5-30 μm. One implementation uses a modulation layer 360 that is made up of a hole patterned electrode that is a coating of Indium Tin Oxide (ITO) having a thickness of 10-50 nm, and a layer of a frequency dependent permittivity material (such as Titanium Oxide) having a thickness of about 10 nm. Additional layers of the structure, such as alignment layers of 20-40 nm thickness and electrodes of 10-50 nm thickness do not add much to the overall size of the structure. Thus, a TLCL such as that shown in FIG. 14 may have a wafer-level component structure on the order of about 200 μm to 400 μm thick. If the wafer-level component structure consists of two structures like that of FIG. 14, the total thickness would therefore be on the order of 400-800 μm. The dimensions of the added discrete components increase the thickness of the final device, but the base wafer-level component structure is very thin.

After wafer-level fabrication of the camera modules, including the addition of the discrete components such as image sensors and optical trim elements, the wafer level manufacturing process includes testing and singulating useful camera modules from the wafer array. Operational testing identifies operational camera modules. A number of camera modules in the array, possibly larger than the actual number of tested camera modules, can be designated as useful. A number of camera modules in the array, possibly larger than the actual number of tested camera modules, can be designated as rejected.

Typically singulation includes: a scribe and break process, a mechanical dicing process, or an optical dicing process. In a scribe and break process, a linear defect (the scribe line) is formed in the wafer and then the wafer is stressed until the wafer fractures along the linear defect. For mechanical dicing, an abrasive wheel is used to remove a strip of material which removes (separates) a part of the wafer. In an optical dicing process, a laser is used to remove a strip of material to separate the wafer. FIGS. 10-14 show schematically the regions 356 of the wafers around the individual devices to be removed during singulation.

It is understood that in the embodiments in which the optical trim elements are fabricated separately, such optical trim elements may be tested for optical errors and the configuration of the very same optical trim elements compensated for optical errors of the camera module core and those of the optical trim element.

The finished camera module can then be packaged by making contact to wires, lead frames, or flexible circuits. Typically a conductive adhesive or solder is used to make these connections. After making the connections, the area around the perimeter of the camera module is filled with an encapsulating material which protects the camera module from harsh environments and mechanical abuse.

The manufacture of complete camera modules by wafer-level fabrication (i.e., prior to singulation) provides significant advantages over the prior art. The size and stability of the wafer as a substrate simplifies the step of affixing external components to the wafer-level component structure. The process of singulation then yields devices which are complete with the exception of such finishing steps such as lead attachment. As such, the present invention provides a simpler and more efficient means of device manufacture.

In accordance with the proposed solution, advantages are derived from: small camera module size factors provided by the elimination of adjustment previously necessary for compensating for manufacturing tolerances; and from an improved adjustment wafer scale manufacturing process producing such camera modules.

While the invention has been shown and described with referenced to preferred embodiments thereof, it will be recognized by those skilled in the art that various changes in form and detail may be made therein without departing from the spirit and scope of the invention as defined by the appended claims.

What is claimed is:

1. A method of wafer scale manufacturing a camera module, said method comprising:
    providing an array of image sensors;
    providing a corresponding array of lens structures;
    assembling said array of lens structures and said array of image sensors, each lens structure being mounted on a corresponding image sensor;
    providing an array of configurable optical trim elements, each configurable optical trim element being configured to correct a preset optical power of a corresponding lens structure when said configurable optical trim element is combined with a corresponding lens structure and image sensor assembly, said preset optical power being insufficient to focus an image at infinity on said image sensor assuming minimum manufacturing tolerances;
    determining optical errors of said assembled lens structure and image sensor array;
    configuring each said configurable optical trim element corresponding to each said image sensor and lens structure assembly to compensate for said optical errors, said configurable optical trim element correcting said preset optical power of said lens structure to cause said image at infinity to focus on said image sensor when said configurable optical trim element is combined with said corresponding lens structure and image sensor assembly;
    assembling said array of configurable optical trim elements and said array of lens structure and image sensor assemblies forming an array of camera modules; and
    singulating said camera module from said camera module array.

2. A method as claimed in claim 1, wherein at least one of said array of lens structures and said array of image sensors is in wafer form, said assembling said array of lens structures and said array of image sensors further comprising: bonding said array of lens structures and said array of image sensors.

3. A method as claimed in claim 1, said determining further comprising:
    testing optical properties of each image sensor and lens structure assembly to identify at least one of an optical distortion and an optical aberration; and
    quantifying said at least one optical distortion and aberration in terms of at least one optical property from optical power, astigmatism, coma, optical axis shift and optical axis reorientation.

4. A method as claimed in claim 3, wherein determining said optical error precedes assembling said array of configurable optical trim elements to said assemblies, said testing further comprising testing said optical properties of each assembly accounting for optical properties of corresponding unconfigured optical trim elements.

5. A method as claimed in claim 4 further comprising:
    testing optical properties of each configurable optical trim element to identify at least one of an optical distortion and an optical aberration; and
    quantifying said at least one optical distortion and aberration in terms of at least one optical property from optical power, astigmatism, coma, optical axis shift and optical axis reorientation.

6. A method as claimed in claim 5, wherein said array of configurable optical trim elements includes a wafer thereof, said method further comprising:
    testing said wafer of configurable optical trim elements; and
    bonding said wafer of configurable optical trim elements and said lens structure and image sensor assemblies to form said camera module array.

7. A method as claimed in claim 3, wherein assembling said array of configurable optical trim elements to said array of assemblies precedes determining optical errors, determining optical errors after forming said array of camera modules accounting for all optical errors.

8. A method as claimed in claim 3, wherein said array of configurable optical trim elements includes one time configurable optical trim elements, said configuring further comprising separately configuring said at least one optical property from optical power, astigmatism, coma, optical axis shift and optical axis reorientation to counteract said at least one of optical distortion and aberration incurred.

9. A method as claimed in claim 8, wherein each configurable optical trim element includes a pair of cell walls defining a cavity, the cavity being filled with liquid crystal molecules, at least one of the cell walls having an ordered surface layer that interacts with the liquid crystal molecules to cause alignment of the liquid crystal molecules in a zero field ground state in a predetermined director orientation, configuring said configurable optical trim element further comprising forming the ordered surface layer with molecules aligned using a programming field without mechanical rubbing.

10. A method as claimed in claim 8 further comprising:
    applying a substantially uniform electric field to a nematic liquid crystal/monomer mixture within a cell; and
    simultaneously irradiating the nematic liquid crystal/monomer mixture using a laser beam having a shaped intensity distribution so as to induce formation of a spatially non-homogenous polymer network structure within the cell.

11. A method as claimed in claim 3, wherein assembling said array of configurable optical trim elements to said array of assemblies precedes assembling said array of lens structures and said array of image sensors, determining optical errors after forming said array of camera modules accounting for all optical errors incurred in forming said array of camera modules.

12. A method as claimed in claim 1, wherein each configurable optical trim element is a tunable liquid crystal lens having a segmented hole patterned electrode and a frequency dependent layer.

13. A method as claimed in claim 12 further comprising configuring a signal generator to produce at least one drive signal causing said tunable liquid crystal lens to impart at least one of optical power, astigmatism, coma, optical axis shift and optical axis reorientation onto incident light to counteract said at least one of optical distortion and aberration incurred.

14. A method as claimed in claim 13 further comprising repeatedly testing and configuring said signal generator to produce said at least one drive signal causing said segmented electrode tunable liquid crystal lens to impart at least one of optical power, optical axis shift and optical axis reorientation onto incident light to provide image stabilization.

15. A method as claimed in claim 3, wherein each said configurable optical trim element includes a one-time configurable optical trim element, said configuring further comprising in situ configuring said at least one optical property from optical power, astigmatism, coma, optical axis shift and optical axis reorientation to counteract said at least one of optical distortion and aberration incurred.

16. A method as claimed in claim 4, configuring said configurable optical trim element further comprising: depositing a lens on a surface of the lens structure assembly in an optical path, said deposited lens compensating for optical power insufficiencies, a location of said deposition being selected to compensate for optical axis reorientation errors.

17. A method as claimed in claim 1 providing said array of lens structures further comprises wafer manufacturing said array of lens structures.

18. A method as claimed in claim 1 singulating further comprising:
testing optical functionality of camera modules in said camera module array;
identifying operational camera modules based on said testing;
singulating from the camera module array any operational camera module identified by said testing; and
rejecting any camera module based on said testing.

19. A camera module manufactured employing the manufacturing method of claim 1.

20. A method of manufacturing a camera module, said method comprising:
providing an image sensor;
providing a lens structure;
assembling said lens structure and said image sensor, said lens structure being mounted on said image sensor;
providing a configurable optical trim element configured to correct a preset optical power of said lens structure when said configurable optical trim element is combined with said lens structure and image sensor assembly, said preset optical power being insufficient to focus an image at infinity on said image sensor assuming minimum manufacturing tolerances;
determining optical errors of said assembled lens structure and image sensor;
configuring said configurable optical trim element to compensate for said optical errors, said configurable optical trim element correcting said preset optical power of said lens structure to cause said image at infinity to focus on said image sensor when said configurable optical trim element is combined with said lens structure and image sensor assembly; and
assembling said configurable optical trim element and said lens structure and image sensor assembly forming said camera module.

21. A method as claimed in claim 20, assembling said lens structure and said image sensor further comprising: bonding said lens structure and said image sensor.

22. A method as claimed in claim 20, said determining further comprising:
testing optical properties of said image sensor and lens structure assembly to identify at least one of an optical distortion and an optical aberration; and
quantifying said at least one optical distortion and aberration in terms of at least one optical property from optical power, astigmatism, coma, optical axis shift and optical axis reorientation.

23. A method as claimed in claim 22, wherein determining said optical error precedes assembling said configurable optical trim element to said assembly, said testing further comprising testing said optical properties of said assembly accounting for optical properties of an unconfigured configurable optical trim element.

24. A method as claimed in claim 23 further comprising:
testing optical properties of said configurable optical trim element to identify at least one of an optical distortion and an optical aberration; and
quantifying said at least one optical distortion and aberration in terms of at least one optical property from optical power, astigmatism, coma, optical axis shift and optical axis reorientation.

25. A method as claimed in claim 24 further comprising:
testing said configurable optical trim element; and
bonding said configurable optical trim element and said lens structure and image sensor assembly to form said camera module.

26. A method as claimed in claim 22, wherein assembling said configurable optical trim element to said assembly precedes determining optical errors, determining optical errors after forming said camera module accounting for all optical errors.

27. A method as claimed in claim 22, wherein said configurable optical trim element includes a one time configurable optical trim element, said configuring further comprising configuring said at least one optical property from optical power, astigmatism, coma, optical axis shift and optical axis reorientation to counteract said at least one of optical distortion and aberration incurred.

28. A method as claimed in claim 27, wherein said configurable optical trim element includes a pair of cell walls defining a cavity, the cavity being filled with liquid crystal molecules, at least one of the cell walls having an ordered surface layer that interacts with the liquid crystal molecules to cause alignment of the liquid crystal molecules in a zero field ground state in a predetermined director orientation, configuring said configurable optical trim element further comprising forming the ordered surface layer with molecules aligned using a programming field without mechanical rubbing.

29. A method as claimed in claim 27 further comprising:
applying a substantially uniform electric field to a nematic liquid crystal/monomer mixture within a cell; and
simultaneously irradiating the nematic liquid crystal/monomer mixture using a laser beam having a shaped intensity distribution so as to induce formation of a spatially non-homogenous polymer network structure within the cell.

30. A method as claimed in claim 22, wherein assembling said configurable optical trim element to said assembly precedes assembling said lens structure and said image sensor, determining optical errors after forming said camera module accounting for all optical errors incurred in forming said camera module.

31. A method as claimed in claim 20, wherein said configurable optical trim element is a tunable liquid crystal lens having a segmented hole patterned electrode and a frequency dependent layer.

32. A method as claimed in claim 31 further comprising configuring a signal generator to produce at least one drive signal causing said tunable liquid crystal lens to impart at least one of optical power, astigmatism, coma, optical axis shift and optical axis reorientation onto incident light to counteract said at least one of optical distortion and aberration incurred.

33. A method as claimed in claim 32 further comprising repeatedly testing and configuring said signal generator to produce said at least one drive signal causing said segmented electrode tunable liquid crystal lens to impart at least one of optical power, optical axis shift and optical axis reorientation onto incident light to provide image stabilization.

34. A method as claimed in claim 22, wherein said configurable optical trim element includes a one-time configurable optical trim element, said configuring further comprising in situ configuring said at least one optical property from optical power, astigmatism, coma, optical axis shift and optical axis reorientation to counteract said at least one of optical distortion and aberration incurred.

35. A method as claimed in claim 23 configuring said configurable optical trim element further comprising: depositing a lens on a surface of the lens structure assembly in an optical path, said deposited lens compensating for optical power insufficiencies, a location of said deposition being selected to compensate for optical axis reorientation errors.

36. A camera module manufactured employing the manufacturing method of claim 20.

* * * * *